(12) United States Patent
York

(10) Patent No.: US 10,132,988 B2
(45) Date of Patent: Nov. 20, 2018

(54) LUMINAIRE MODULE WITH MULTIPLE LIGHT GUIDE ELEMENTS

(71) Applicant: Quarkstar LLC, Las Vegas, NV (US)

(72) Inventor: Allan Brent York, Langley (CA)

(73) Assignee: Quarkstar LLC, Las Vegas, NV (US)

( * ) Notice: Subject to any disclaimer, the term of this patent is extended or adjusted under 35 U.S.C. 154(b) by 315 days.

(21) Appl. No.: 15/150,300

(22) Filed: May 9, 2016

(65) Prior Publication Data

US 2017/0038518 A1 Feb. 9, 2017

Related U.S. Application Data

(63) Continuation of application No. 14/422,328, filed as application No. PCT/US2014/047285 on Jul. 18, 2014, now Pat. No. 9,335,462.

(Continued)

(51) Int. Cl.
*F21V 7/04* (2006.01)
*F21V 1/00* (2006.01)
(Continued)

(52) U.S. Cl.
CPC .............. *G02B 6/0073* (2013.01); *F21S 8/04* (2013.01); *F21V 7/0016* (2013.01); *F21V 7/0091* (2013.01); *G02B 6/002* (2013.01); *G02B 6/0006* (2013.01); *G02B 6/0008* (2013.01); *G02B 6/0023* (2013.01); *G02B 6/0031* (2013.01);
(Continued)

(58) Field of Classification Search
CPC .... F21V 2200/00; F21V 22/20; F21V 7/0016; F21V 7/0091; F21V 14/00; F21V 14/003; F21S 8/04; G09F 2013/189; G09F 13/18; G02F 1/133615; F21Y 2101/00; F21Y 2115/10; F21Y 2103/10; G02B 6/0008; G02B 6/0073; G02B 6/0051; G02B 6/0085; G02B 6/0068; G02B 6/002; G02B 6/0036; G02B 6/0035
See application file for complete search history.

(56) References Cited

U.S. PATENT DOCUMENTS 2,194,841 A 3/1940 Welch
2,626,120 A 1/1953 Baker
(Continued)

FOREIGN PATENT DOCUMENTS

CA 2 702 690 11/2010
DE 199 17 401 10/2000
(Continued)

OTHER PUBLICATIONS

European Application No. EP16 159 648.1, Communication pursuant to Article 94(3) EPC, dated Oct. 6, 2016, 5 pages.
(Continued)

*Primary Examiner* — Erin Kryukova
(74) *Attorney, Agent, or Firm* — Fish & Richardson P.C.

(57) ABSTRACT

A variety of luminaire modules are disclosed that are configured to output light provided by multiple light-emitting elements (LEEs). In general, embodiments of the luminaire modules feature at least two LEEs disposed on at least one substrate, at least two light guides that receive light from corresponding LEEs of the at least two LEEs, and at least one optical extractor that receives light from corresponding light guides from the at least two light guides.

18 Claims, 11 Drawing Sheets

Related U.S. Application Data

(60) Provisional application No. 61/856,009, filed on Jul. 18, 2013.

(51) Int. Cl.
   *F21V 11/00* (2015.01)
   *F21V 7/00* (2006.01)
   *F21V 8/00* (2006.01)
   *F21S 8/04* (2006.01)
   F21Y 103/10 (2016.01)
   F21Y 115/10 (2016.01)
   F21Y 101/00 (2016.01)

(52) U.S. Cl.
   CPC ......... *G02B 6/0035* (2013.01); *G02B 6/0036* (2013.01); *G02B 6/0045* (2013.01); *G02B 6/0051* (2013.01); *G02B 6/0055* (2013.01); *G02B 6/0068* (2013.01); *G02B 6/0076* (2013.01); *G02B 6/0085* (2013.01); F21Y 2101/00 (2013.01); F21Y 2103/10 (2016.08); F21Y 2115/10 (2016.08)

(56) References Cited

U.S. PATENT DOCUMENTS

| | | | |
|---|---|---|---|
| 3,442,568 A | 5/1969 | Koester | |
| 3,772,506 A | 11/1973 | Junginger | |
| 3,836,767 A | 9/1974 | Lasker | |
| 4,112,483 A | 9/1978 | Small et al. | |
| 4,240,692 A | 12/1980 | Winston | |
| 4,254,456 A | 3/1981 | Grindle et al. | |
| 4,271,408 A | 6/1981 | Teshima et al. | |
| 4,358,817 A | 11/1982 | Bielemeier | |
| 5,075,827 A | 12/1991 | Smith | |
| 5,134,550 A | 7/1992 | Young | |
| 5,289,356 A | 2/1994 | Winston | |
| 5,436,805 A | 7/1995 | Hsu et al. | |
| 5,438,485 A | 8/1995 | Li et al. | |
| 5,764,828 A | 6/1998 | Iga et al. | |
| 5,810,463 A | 9/1998 | Kawahara et al. | |
| 5,868,489 A | 2/1999 | Fuller et al. | |
| 5,873,644 A | 2/1999 | Roessner et al. | |
| 5,988,836 A | 11/1999 | Sawarens | |
| 6,058,271 A | 5/2000 | Tenmyo | |
| 6,234,643 B1 | 5/2001 | Lichon | |
| 6,241,369 B1 | 6/2001 | Mackiewicz | |
| 6,273,577 B1 | 8/2001 | Goto et al. | |
| 6,350,041 B1 | 2/2002 | Tarsa et al. | |
| 6,441,943 B1 | 8/2002 | Roberts et al. | |
| 6,505,953 B1 | 1/2003 | Dahlen | |
| 6,527,420 B1 | 3/2003 | Chuang | |
| 6,540,373 B2 | 4/2003 | Bailey | |
| 6,543,911 B1 | 4/2003 | Rizkin et al. | |
| 6,572,246 B1 | 6/2003 | Hopp et al. | |
| 6,598,998 B2 | 7/2003 | West et al. | |
| 6,802,628 B2 | 10/2004 | Kuo | |
| 6,834,979 B1 | 12/2004 | Cleaver et al. | |
| 6,880,963 B2 | 4/2005 | Luig et al. | |
| 6,932,499 B2 | 8/2005 | Ogura | |
| 6,991,358 B2 | 1/2006 | Kokogawa | |
| 7,083,315 B2 | 8/2006 | Hansler et al. | |
| 7,097,337 B2 | 8/2006 | Kim et al. | |
| 7,134,768 B2 | 11/2006 | Suzuki | |
| 7,156,540 B2 | 1/2007 | Haines | |
| 7,164,842 B2 | 1/2007 | Chen | |
| 7,182,480 B2 | 2/2007 | Kan | |
| 7,246,931 B2 | 7/2007 | Hsieh et al. | |
| 7,259,403 B2 | 8/2007 | Shimizu et al. | |
| 7,275,841 B2 | 10/2007 | Kelly | |
| 7,286,296 B2 | 10/2007 | Chaves et al. | |
| 7,290,906 B2 | 11/2007 | Suzuki et al. | |
| 7,293,889 B2 | 11/2007 | Kamiya | |
| 7,331,691 B2 | 2/2008 | Livesay et al. | |
| 7,334,932 B2 | 2/2008 | Klettke | |
| 7,341,358 B2 | 3/2008 | Hsieh et al. | |
| 7,375,382 B2 | 5/2008 | Tessnow | |
| 7,386,214 B1 | 6/2008 | Canciotto | |
| 7,387,399 B2 | 6/2008 | Noh et al. | |
| 7,434,951 B2 | 10/2008 | Bienick | |
| 7,530,712 B2 | 5/2009 | Lin et al. | |
| 7,645,054 B2 | 1/2010 | Goihl | |
| 7,837,370 B2 | 11/2010 | Bierhuizen et al. | |
| 7,850,347 B2 | 12/2010 | Speier et al. | |
| 7,855,815 B2 | 12/2010 | Hayashide et al. | |
| 7,942,546 B2 | 5/2011 | Naijo et al. | |
| 7,947,915 B2 | 5/2011 | Lee et al. | |
| 7,967,477 B2 | 6/2011 | Bloemen et al. | |
| 8,002,446 B1 | 8/2011 | Plunk et al. | |
| 8,006,453 B2 | 8/2011 | Anderson | |
| 8,042,968 B2 | 10/2011 | Boyer et al. | |
| 8,061,867 B2 | 11/2011 | Kim et al. | |
| 8,068,707 B1 | 11/2011 | Simon | |
| 8,075,147 B2 | 12/2011 | Chaves et al. | |
| 8,192,051 B2 | 6/2012 | Dau et al. | |
| 8,277,106 B2 | 10/2012 | Van Gorkom et al. | |
| 8,348,489 B2 | 1/2013 | Holman et al. | |
| 8,506,112 B1 | 8/2013 | Dau et al. | |
| 8,573,823 B2 | 11/2013 | Dau | |
| 8,602,586 B1 | 12/2013 | Dau et al. | |
| 8,696,184 B2 | 4/2014 | Morino et al. | |
| 8,740,407 B2 | 6/2014 | Kotovsky et al. | |
| 8,833,969 B2 | 9/2014 | Speier et al. | |
| 8,833,996 B2 | 9/2014 | Dau et al. | |
| 8,899,808 B2 | 12/2014 | Speier | |
| 9,519,095 B2 | 12/2016 | Wilcox et al. | |
| 9,625,636 B2 | 4/2017 | Durkee et al. | |
| 2003/0117798 A1 | 6/2003 | Leysath | |
| 2004/0012976 A1 | 1/2004 | Amano | |
| 2004/0080947 A1 | 4/2004 | Subisak et al. | |
| 2004/0105264 A1 | 6/2004 | Spero | |
| 2004/0120160 A1 | 6/2004 | Natsume | |
| 2004/0137189 A1 | 7/2004 | Tellini et al. | |
| 2004/0190307 A1 | 9/2004 | Kitamura et al. | |
| 2004/0208019 A1 | 10/2004 | Koizumi | |
| 2004/0228131 A1 | 11/2004 | Minano et al. | |
| 2004/0257803 A1 | 12/2004 | Kermoade | |
| 2005/0018147 A1 | 1/2005 | Lee et al. | |
| 2005/0057922 A1 | 3/2005 | Herst et al. | |
| 2005/0063169 A1 | 3/2005 | Erber | |
| 2005/0083713 A1 | 4/2005 | Boks | |
| 2005/0111235 A1 | 5/2005 | Suzuki et al. | |
| 2005/0185416 A1 | 8/2005 | Lee et al. | |
| 2005/0207177 A1 | 9/2005 | Guy | |
| 2005/0243570 A1 | 11/2005 | Chaves et al. | |
| 2005/0259224 A1 | 11/2005 | Lee et al. | |
| 2005/0265044 A1 | 12/2005 | Chen et al. | |
| 2005/0270774 A1 | 12/2005 | Pan | |
| 2005/0276566 A1 | 12/2005 | Iimura | |
| 2006/0002678 A1 | 1/2006 | Weber et al. | |
| 2006/0061990 A1 | 3/2006 | Chinniah et al. | |
| 2006/0076568 A1 | 4/2006 | Keller et al. | |
| 2006/0098444 A1 | 5/2006 | Petruzzi | |
| 2006/0139917 A1 | 6/2006 | Ward | |
| 2006/0164839 A1 | 7/2006 | Stefanov | |
| 2006/0187661 A1 | 8/2006 | Holten | |
| 2006/0274218 A1 | 12/2006 | Xue | |
| 2007/0047228 A1 | 3/2007 | Thompson et al. | |
| 2007/0061360 A1 | 3/2007 | Holcombe et al. | |
| 2007/0081360 A1 | 4/2007 | Bailey | |
| 2007/0097696 A1 | 5/2007 | Eng et al. | |
| 2007/0171678 A1 | 7/2007 | Shim et al. | |
| 2007/0201234 A1 | 8/2007 | Ottermann | |
| 2007/0280593 A1 | 12/2007 | Brychell et al. | |
| 2008/0068852 A1 | 3/2008 | Goihl | |
| 2008/0074752 A1 | 3/2008 | Chaves et al. | |
| 2008/0080166 A1 | 4/2008 | Duong et al. | |
| 2008/0170398 A1 | 7/2008 | Kim | |
| 2008/0192458 A1 | 8/2008 | Li | |
| 2008/0198603 A1 | 8/2008 | Sormani et al. | |
| 2008/0316381 A1 | 12/2008 | Wu | |
| 2009/0027588 A1 | 1/2009 | Medendorp, Jr. et al. | |
| 2009/0103293 A1 | 4/2009 | Harbers et al. | |
| 2009/0168395 A1 | 7/2009 | Mrakovich et al. | |

(56) References Cited

U.S. PATENT DOCUMENTS

| | | |
|---|---|---|
| 2009/0201698 A1 | 8/2009 | Klick et al. |
| 2009/0231831 A1 | 9/2009 | Hsiao |
| 2009/0231878 A1 | 9/2009 | Van Duijneveldt |
| 2009/0316414 A1 | 12/2009 | Yang |
| 2010/0061080 A1 | 3/2010 | Salters et al. |
| 2010/0085773 A1 | 4/2010 | Richardson |
| 2010/0220497 A1 | 9/2010 | Ngai |
| 2010/0246158 A1 | 9/2010 | Van Gorkom et al. |
| 2011/0001901 A1 | 1/2011 | Solomon et al. |
| 2011/0007518 A1* | 1/2011 | de Lamberterie ... B60Q 1/2607 362/511 |
| 2011/0063870 A1 | 3/2011 | Nomoto et al. |
| 2011/0103067 A1 | 5/2011 | Ago et al. |
| 2011/0164398 A1 | 7/2011 | Holten et al. |
| 2011/0175533 A1 | 7/2011 | Holman et al. |
| 2011/0182084 A1 | 7/2011 | Tomlinson |
| 2011/0199005 A1 | 8/2011 | Bretschneider et al. |
| 2011/0227487 A1 | 9/2011 | Nichol et al. |
| 2011/0234121 A1 | 9/2011 | Ding et al. |
| 2011/0235318 A1 | 9/2011 | Simon |
| 2011/0267836 A1 | 11/2011 | Boonekamp et al. |
| 2011/0273900 A1 | 11/2011 | Li et al. |
| 2011/0286200 A1 | 11/2011 | Iimura |
| 2012/0020066 A1 | 1/2012 | Chang |
| 2012/0044675 A1 | 2/2012 | Buelow et al. |
| 2012/0069595 A1 | 3/2012 | Catalano |
| 2012/0069600 A1 | 3/2012 | Lin et al. |
| 2012/0099310 A1 | 4/2012 | Kropac et al. |
| 2012/0147621 A1 | 6/2012 | Holten et al. |
| 2012/0147624 A1 | 6/2012 | Li et al. |
| 2012/0155110 A1 | 6/2012 | Pijlman et al. |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum et al. |
| 2012/0281432 A1 | 11/2012 | Parker et al. |
| 2012/0294037 A1 | 11/2012 | Holman et al. |
| 2012/0328242 A1 | 12/2012 | Hesse |
| 2013/0039050 A1 | 2/2013 | Dau et al. |
| 2013/0039090 A1 | 2/2013 | Dau |
| 2013/0050584 A1 | 2/2013 | Kaihotsu |
| 2013/0176741 A1* | 7/2013 | Nakamura ............ F21V 13/12 362/347 |
| 2013/0201715 A1 | 8/2013 | Dau et al. |
| 2013/0208495 A1 | 8/2013 | Dau |
| 2013/0272015 A1 | 10/2013 | Weaver |
| 2013/0279198 A1 | 10/2013 | Lin et al. |
| 2014/0104868 A1 | 4/2014 | Speier et al. |
| 2014/0126235 A1 | 5/2014 | Speier et al. |
| 2014/0133172 A1 | 5/2014 | Vissenberg et al. |
| 2014/0192558 A1 | 7/2014 | Dau et al. |

FOREIGN PATENT DOCUMENTS

| | | |
|---|---|---|
| DE | 10 2011 001769 | 10/2012 |
| DE | 102011090197 A1 | 7/2013 |
| EP | 1 182 395 | 2/2002 |
| EP | 2 163 701 | 3/2010 |
| EP | 2 196 725 | 6/2010 |
| EP | 2 264 359 | 12/2010 |
| EP | 2354637 A1 | 8/2011 |
| EP | 2 439 564 | 4/2012 |
| FR | 2784739 | 4/2000 |
| FR | 2934353 | 1/2010 |
| WO | WO 2001/07828 | 2/2001 |
| WO | WO2002097324 A1 | 12/2002 |
| WO | WO 2003/009012 | 1/2003 |
| WO | WO 2005/073629 | 8/2005 |
| WO | WO 2005/090854 | 9/2005 |
| WO | WO 2008/007315 | 1/2008 |
| WO | WO 2008/047278 | 9/2008 |
| WO | WO 2008/139383 | 11/2008 |
| WO | WO 2009/105168 | 8/2009 |
| WO | WO 2010/042423 | 4/2010 |
| WO | WO 2010/079391 | 7/2010 |
| WO | WO 2010/113091 | 10/2010 |
| WO | WO 2011/112914 | 9/2011 |
| WO | WO 2012/024607 | 2/2012 |
| WO | WO 2012/0931 26 | 7/2012 |
| WO | WO 2012/1315 60 | 11/2012 |
| WO | WO 2012/176352 | 12/2012 |
| WO | WO 2013 /023008 | 2/2013 |
| WO | WO 2013 /066822 | 5/2013 |
| WO | WO 2013 /154835 | 10/2013 |

OTHER PUBLICATIONS

European Application No. 17180485.9, European Search Report dated Dec. 5, 2017, 5 pages.

http://www.everheht.comiciatasheets/01,-Flat Series Data Sheet v5.pcif, "Datasheet: Office Lighting Flat Luminaire Series", product catalog, Everlight, Issue No. Dbm-0000054_v5, May 5, 2011, pp. 1-5.

Notification of Transmittal of the International Search Report and the Written Opinion of the International Searching Authority, International Application No. PCT/US2014/047285, mailed Dec. 2,2014, 11 pages.

Philips Lighting Company, "Philips EnduraLED Candle Led Lamps", Downloaded from the internet at: www.lighting.philips.comlus etilbrowsehteratureldownloadip-6027 on Jan. 27, 2012, 2 pp. (2010).

* cited by examiner

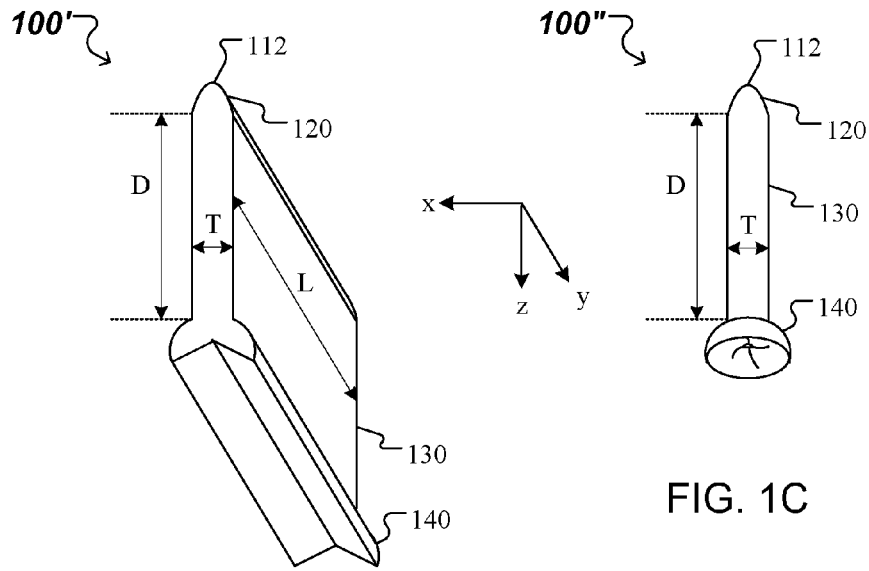
FIG. 1B
FIG. 1C
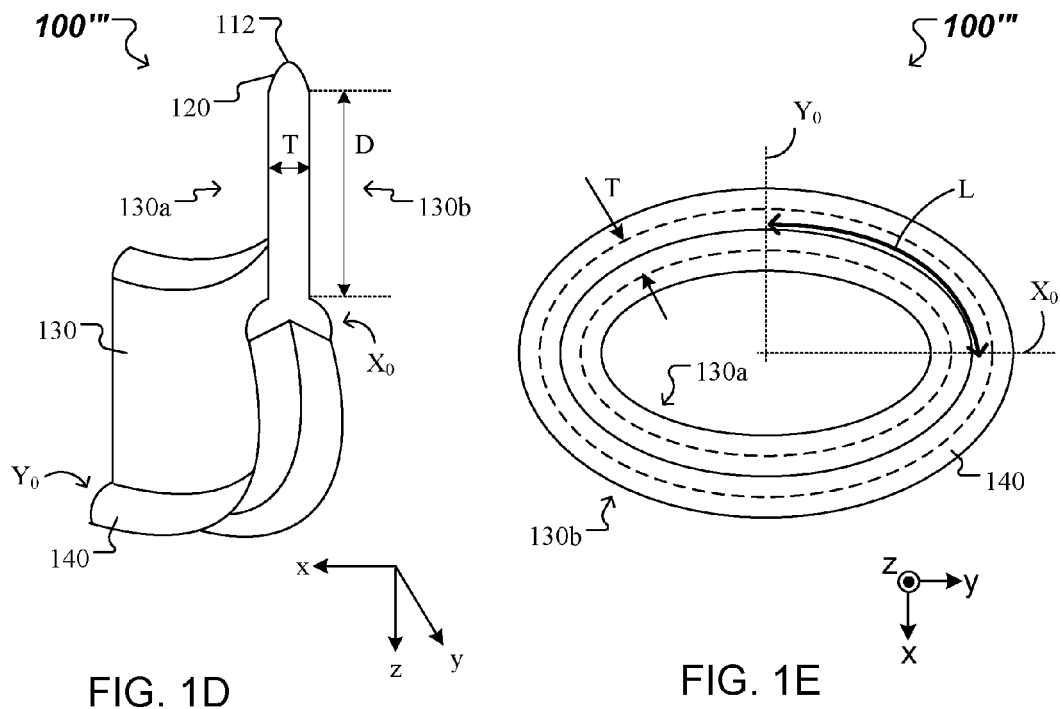
FIG. 1D
FIG. 1E

LUMINAIRE MODULE WITH MULTIPLE LIGHT GUIDE ELEMENTS

CROSS-REFERENCE TO RELATED APPLICATION

This application is a continuation application and claims priority to U.S. patent application Ser. No. 14/422,328, filed Feb. 18, 2015, which claims benefit under 35 U.S.C. § 119(e)(1) of U.S. Provisional Application No. 61/856,009, filed on Jul. 18, 2013, the entire contents of which are incorporated by reference herein

TECHNICAL FIELD

The present technology relates generally to luminaire modules with multiple light guides featuring solid state light-emitting elements.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and light-emitting diodes (LEDs).

SUMMARY

The present technology relates generally to luminaire modules with multiple light guides featuring solid state light-emitting elements.

A variety of luminaires (also referred to as luminaire modules) are disclosed that are configured to manipulate light provided by one or more light-emitting elements (LEEs). In general, embodiments of the luminaires feature one or more optical couplers (e.g., parabolic reflectors) that redirect light emitted from the LEEs to one or more optical extractors which then direct the light into a range of angles. In certain embodiments, the luminaire includes one or more light guides that guide light from the optical couplers to the corresponding optical extractors. The components of the luminaire can be configured in a variety of ways so a variety of intensity distributions can be output by the luminaire. Such luminaires can be configured to provide light for particular lighting applications, including office lighting, task lighting, cabinet lighting, garage lighting, wall wash, stack lighting, and down-lighting.

Accordingly, various aspects of the invention are summarized as follows.

In general, in a first aspect, the invention features a luminaire module including a first set of light-emitting elements (LEEs) disposed on one or more substrates and adapted to emit light in a forward direction; a first light guide shaped to guide light, emitted by the first set of LEEs and received at an input end of the first light guide, in the forward direction to an output end of the first light guide and provide first guided light at the output end of the first light guide; a first optical extractor optically coupled with the output end of the first light guide and adapted to receive the first guided light, the first optical extractor having at least one redirecting surface, the at least one redirecting surface of the first optical extractor being adapted to reflect at least a portion of the light received at the first optical extractor in a first direction that has a component orthogonal to the forward direction; a second set of LEEs disposed on the one or more substrates and adapted to emit light in the forward direction, the second set of LEEs being independently controllable from the first set of LEEs; a second light guide optically shaped to guide light, emitted by the second set of LEEs and received at the input end of the second light guide, in the forward direction to an output end of the second light guide and provide second guided light at the output end of the first light guide; and a second optical extractor optically coupled with the output end of the second light guide and adapted to receive the second guided light, the second optical extractor having at least one redirecting surface, the at least one redirecting surface of the second optical extractor being adapted to reflect at least a portion of the light received at the second optical extractor in a second direction that has a component orthogonal to the forward direction and antiparallel to the orthogonal component of the first direction.

The foregoing and other embodiments can each optionally include one or more of the following features, alone or in combination. In some implementations, the luminaire module can further include one or more first couplers positioned to receive a portion of the light emitted by the first set of LEEs and adapted to at least partially collimate the received portion of the light, the one or more first couplers being optically coupled with the first light guide at an input end of the first light guide; and one or more second couplers positioned to receive a portion of the light emitted by the second set of LEEs and adapted to at least partially collimate the received portion of the light, the one or more second couplers being optically coupled with the second light guide at an input end of the second light guide.

In some implementations, the second set of LEEs can be adjacent to the first set of LEEs. In some implementations, at least one of the first and second directions has a component that is antiparallel to the forward direction. In some implementations, the first optical extractor can include one or more output surfaces, and the first optical extractor can direct at least a portion of the light received from the first light guide towards the one or more output surfaces of the first optical extractor, and the second optical extractor can include one or more output surfaces, and the second optical extractor can direct at least a portion of the light received from the second light guide towards the one or more output surfaces of the second optical extractor.

In some implementations, the first and second light guide can be spaced apart forming a space between the first and the second light guide, and the space can be filled with a medium to control total internal reflection at respective interfaces of the first and second light guides with the medium. In some implementations, the medium can be an electronically controllable fluid. In some implementations, the medium can include one or more liquid crystal sheets disposed between the first and the second light guide. In some implementations, one or more portions of the first light guide and the second light guide can be optically connected such that light is transmitted via the one or more connected portions.

In some implementations, at least one of the at least one redirecting surface of the first optical extractor or the at least one redirecting surface of the second optical extractor can be at least partially reflective for light received from at least one of the first light guide or the second light guide. In some implementations, one or more of the at least one redirecting surface of the first optical extractor or the at least one redirecting surface of the second optical extractor can be partially transmissive for the light received from at least one of the first light guide or the second light guide. In some implementations, one or more of the at least one redirecting surface of the first optical extractor or the at least one redirecting surface of the second optical extractor can reflect substantially all of the light received from at least one of the first light guide or the second light guide.

In some implementations, the first set of LEEs can be powered independently from the second set of LEEs. In some implementations, the first set of LEEs and the second set of LEEs can be independently controllable via a first power connection to the first set of LEEs and second power connection to the second set of LEEs. In some implementations, the first set of LEEs can be independently controllable from the second set of LEEs to selectively provide different relative intensities between light provided along the first direction and light provided along the second direction. In some implementations, the first set of LEEs can be independently controllable from the second set of LEEs to selectively provide different chromaticities between light provided along the first direction and light provided along the second direction. In some implementations, a subset of one of more LEEs of the first set of LEEs are operated independently of other LEEs of the first set of LEEs. In some implementations, a subset of one of more LEEs of the second set of LEEs can be operated independently of other LEEs of the second set of LEEs.

In general, in a further aspect, the invention features a luminaire module including a first set of light-emitting elements (LEEs) disposed on one or more substrates and adapted to emit light in a forward direction; a first light guide shaped to guide light, emitted by the first set of LEEs and received at an input end of the first light guide, in the forward direction to an output end of the first light guide and provide first guided light at the output end of the first light guide; a second set of LEEs disposed on the one or more substrates and adapted to emit light in the forward direction, the second set of LEEs being independently controllable from the first set of LEEs; a second light guide optically shaped to guide light, emitted by the second set of LEEs and received at the input end of the second light guide, in the forward direction to an output end of the second light guide and provide second guided light at the output end of the first light guide; and an optical extractor optically coupled with the output end of the first light guide and the output end of the second light guide and adapted to receive the first and second guided light, the optical extractor having at least one first redirecting surface and at least one second redirecting surface, the at least one first redirecting surface being adapted to reflect at least a portion of the light received at the optical extractor from the first light guide in a first direction that has a component orthogonal to the forward direction and the at least one second redirecting surface being adapted to reflect at least a portion of the light received at the optical extractor from the second light guide in a second direction that has a component orthogonal to the forward direction and antiparallel to the orthogonal component of the first direction.

The foregoing and other embodiments can each optionally include one or more of the following features, alone or in combination. In some implementations, the optical extractor can emit light in the forward direction. In some implementations, the luminaire module can further include one or more first couplers positioned to receive a portion of the light emitted by the first set of LEEs and adapted to at least partially collimate the received portion of the light, the one or more first couplers being optically coupled with the first light guide at an input end of the first light guide; and one or more second couplers positioned to receive a portion of the light emitted by the second set of LEEs and adapted to at least partially collimate the received portion of the light, the one or more second couplers being optically coupled with the second light guide at an input end of the second light guide.

In some implementations, the second set of LEEs can be adjacent to the first set of LEEs. In some implementations, at least one of the first and second direction can have a component that is antiparallel to the forward direction. In some implementations, the optical extractor can include at least one first output surface and at least one second output surface, and wherein the optical extractor directs at least a portion of the light received from the first light guide towards the at least one first output surface of the optical extractor and at least a portion of the light received from the second light guide towards the at least one second output surface of the optical extractor.

In some implementations, the first and second light guide can be spaced apart forming a space between the first and the second light guide, and wherein the space can include a medium to control total internal reflection at respective interfaces of the first and second light guides with the medium. In some implementations, the medium can include an electronically controllable fluid. In some implementations, the medium can include one or more liquid crystal sheets disposed between the first and the second light guide. In some implementations, one or more portions of the first light guide and the second light guide can be connected such that light is transmitted via the one or more connected portions.

In some implementations, at least one of the at least one first redirecting surface or the at least one second redirecting surface of the optical extractor can include a liquid crystal sheet. In some implementations, at least one of the at least one first redirecting surface or the at least one second redirecting surface of the optical extractor can be at least partially reflective for light received from at least one of the first light guide or the second light guide. In some implementations, one or more of the at least one first redirecting surface or the at least one second redirecting surface of the optical extractor can be partially transmissive for the light received from at least one of the first light guide or the second light guide. In some implementations, one or more of the at least one first redirecting surface or the at least one second redirecting surface of the optical extractor can reflect substantially all of the light received from at least one of the first light guide or the second light guide.

In some implementations, the first set of LEEs can be powered independently from the second set of LEEs. In some implementations, the first set of LEEs and the second set of LEEs can be independently controllable via a first power connection to the first set of LEEs and second power connection to the second set of LEEs. In some implementations, the first set of LEEs can be independently controllable from the second set of LEEs to selectively provide different relative intensities between light provided along the first direction and light provided along the second direction. In some implementations, the first set of LEEs can be independently controllable from the second set of LEEs to selectively provide different chromaticities between light provided along the first direction and light provided along the second direction. In some implementations, a subset of one of more LEEs of the first set of LEEs can be operated independently of other LEEs of the first set of LEEs. In some implementations, a subset of one of more LEEs of the second set of LEEs can be operated independently of other LEEs of the second set of LEEs.

In some embodiments, amounts and/or color of light emitted in different directions can be controlled separately. In some embodiments, light emitted in one solid angle can be controlled independently from light emitted in other solid angles while keeping the form of the light-emission profile in each solid angle substantially the same. In some embodiments, the light-emission profiles in different solid angles and/or corresponding solid angles can be independently controlled. In some embodiments, light can be emitted in a forward direction, a backward direction, or both a forward and backward direction in order to provide direct and/or indirect lighting.

BRIEF DESCRIPTION OF THE DRAWINGS

FIG. 1B is perspective view of another example of an elongated luminaire module with a light guide and an optical extractor.

FIG. 1C is a perspective view of an example of a rotationally symmetric luminaire module with a light guide and a bidirectional optical extractor.

FIGS. 1D-1E are views of an example of an elongated luminaire module with curved light guide and bidirectional optical extractor.

Reference numbers and designations in the various drawings indicate exemplary aspects of implementations of particular features of the present disclosure.

DETAILED DESCRIPTION

The technology described herein can be implemented as solid-state luminaire modules for indirectly (and optionally directly) illuminating a target environment with high degrees of spatial, spectral and temporal control. Such control is accomplished by configuring a luminaire module with multiple sets of LEEs and respective light guides. In this manner, light emitted by each set of LEEs and guided by an associated light guide can be controlled independently (and in some cases interdependently) from light emitted by another set of LEEs and guided by its own associated light guide.

Prior to describing such a luminaire module with multiple independently controllable sets of LEEs and corresponding light guides, various embodiments of luminaire modules with a single set of LEEs and a single light guide are described first.

Figure 1A:
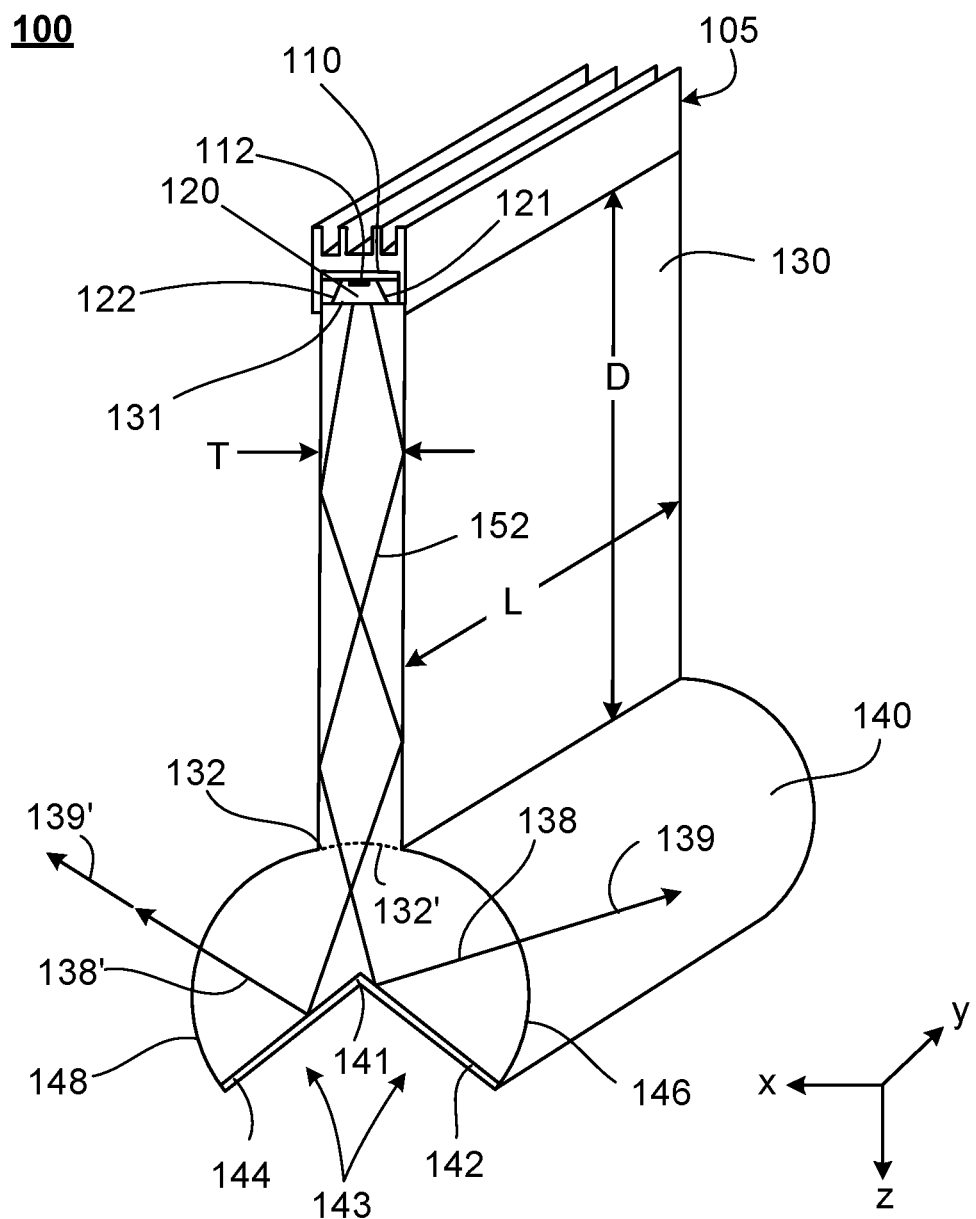
FIG. 1A is a perspective view of an example of an elongated luminaire module with a light guide and a bidirectional optical extractor.

(i) Luminaire Module with a Single Set of LEEs, a Single Light Guide and a Single Bidirectional Extractor Referring to FIG. 1A, in which a Cartesian coordinate system is shown for reference, an embodiment of a luminaire module 100 includes a substrate 110 having a plurality of LEEs 112 distributed along the substrate 110. The LEEs 112 are disposed at an upper edge 131 of a light guide 130. As shorthand, the positive z-direction is referred to herein as the "forward" direction and the negative z-direction is the "backward" direction. Sections through the luminaire parallel to the x-z plane are referred to as the "cross-section" or "cross-sectional plane" of the luminaire module. Also, luminaire module 100 extends along the y-direction, so this direction is referred to as the "longitudinal" direction of the luminaire module. Lastly, embodiments of luminaire modules can have a plane of symmetry parallel to the y-z plane, be curved or otherwise shaped. Depending on the embodiment, one or more components of the luminaire module can be invariant or variant under translation along the y-axis. This is referred to as the "symmetry plane" of the luminaire module.

Multiple LEEs 112 are disposed on the substrate 110, although only one of the multiple LEEs 112 is shown in FIG. 1A. For example, the plurality of LEEs 112 can include multiple white LEDs. An optical extractor 140 is disposed at lower edge of light guide 132. The LEEs 112 are coupled with one or more optical couplers 120 (only one of which is shown in FIG. 1A).

Substrate 110, light guide 130, and optical extractor 140 extend a length L along the y-direction. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, 150 cm or more).

The number of LEEs 112 on the substrate 110 will generally depend, inter alia, on the length L, where more LEEs are used for longer luminaires. In some embodiments, the plurality of LEEs 112 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some embodiments, the luminaire module has an LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In embodiments, LEEs can be evenly spaced along the length, L, of the luminaire. In some implementations, a heat-sink 105 can be attached to the substrate 110 to extract heat emitted by the plurality of LEEs 112. The heat-sink 105 can be disposed on a surface of the substrate 110 opposing the side of the substrate 110 on which the LEEs 112 are disposed.

Optical coupler 120 includes one or more solid pieces of transparent material (e.g., glass or a transparent organic plastic, such as polycarbonate or acrylic) having surfaces 121 and 122 positioned to reflect light from the LEEs 112 towards light guide 130. In general, surfaces 121 and 122 are shaped to collect and collimate light emitted from the LEEs. In the x-z cross-sectional plane, surfaces 121 and 122 can be straight or curved. Examples of curved surfaces include surfaces having a constant radius of curvature, parabolic or hyperbolic shapes. In some embodiments, surfaces 121 and 122 are coated with a highly reflective material (e.g., a reflective metal, such as aluminum), to provide a highly reflective optical interface. The cross-sectional profile of optical coupler 120 can be uniform along the length L of luminaire module 100. Alternatively, the cross-sectional profile can vary. For example, surfaces 121 and/or 122 can be curved out of the x-z plane.

The exit aperture of the optical coupler 120 and the adjacent upper edge of light guide 131 are optically coupled. For example, the surfaces of a solid optical coupler and a solid light guide can be attached using a material that substantially matches the refractive index of the material forming the optical coupler 120 or light guide 130 or both. The optical coupler 120 can be affixed to light guide 130 using an index matching fluid, grease, or adhesive. In some embodiments, optical coupler 120 is fused to light guide 130 or they are integrally formed from a single piece of material.

Light guide 130 is formed from a piece of transparent material (e.g., glass or a transparent organic plastic, such as polycarbonate or acrylic) that can be the same or different from the material forming optical couplers 120. Light guide 130 extends length L in the y-direction, has a thickness uniform T in the x-direction, and a uniform depth D in the z-direction. The dimensions D and T are generally selected based on the desired optical properties of the light guide. During operation, light coupled into the light guide from optical coupler 120 (depicted by rays 152) reflects off the planar surfaces of the light guide by TIR and mixes within the light guide. The mixing can help achieve illuminance and/or color uniformity at the distal portion of the light guide 132 at optical extractor 140. The depth, D, of light guide 130 can be selected to achieve adequate uniformity at the exit aperture (i.e., at end 132) of the light guide. In some embodiments, D is in a range from about 1 cm to about 20 cm (e.g., 2 cm or more, 4 cm or more, 6 cm or more, 8 cm or more, 10 cm or more, 12 cm or more).

In general, optical couplers 120 are designed to restrict the angular range of light entering the light guide 130 (e.g., to within +/−40 degrees) so that at least a substantial amount of the light is coupled into spatial modes in the light guide 130 that undergoes TIR at the planar surfaces. Light guide 130 has a uniform thickness T, which is the distance separating two planar opposing surfaces of the light guide. Generally, T is sufficiently large so the light guide has an aperture at upper surface 131 sufficiently large to approximately match (or exceed) the exit aperture of optical coupler 120. In some embodiments, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the embodiment, the narrower the light guide the better it may mix light. A narrow light guide also provides a narrow exit aperture. As such light emitted from the light guide can be considered to resemble the light emitted from a one-dimensional linear light source, also referred to as an elongate virtual filament.

As discussed previously, length L corresponds to the length of the luminaire and can vary as desired.

While optical coupler 120 and light guide 130 are formed from solid pieces of transparent material, hollow structures are also possible. For example, the optical coupler 120 or the light guide 130 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor. Optical extractor 140 is also composed of a solid piece of transparent material (e.g., glass or a transparent organic plastic, such as polycarbonate or acrylic) that can be the same as or different from the material forming light guide 130. The optical extractor 140 includes surfaces 142 and 144 and curved surfaces 146 and 148. The surfaces 142 and 144 represent first and second portions of a redirecting surface 143, while the curved surfaces 146 and 148 represent first and second output surfaces of the luminaire module 100.

The surfaces 142 and 144 of luminaire module 100 can be flat and coated with a reflective material (e.g., a highly reflective metal such as aluminum or silver) over which a protective coating may be disposed. Furthermore, a material with reflectivity properties that can be controlled during operation, for example an electrochromic, electrowetting, liquid crystal or other mirror layer, may be employed. Thus, surfaces 142 and 144 provide a highly reflective optical interface for light entering an input end 132' of the optical extractor 140 from light guide 130. In the x-z cross-sectional plane, the lines corresponding to surfaces 142 and 144 have the same length and form a v-shape that meets at a vertex 141. In general, the included angle of the v-shape can vary as desired. For example, in some embodiments, the included angle can be relatively small (e.g., from 30° to 60°). In certain embodiments, the included angle is in a range from 60° to 120° (e.g., about) 90°. The included angle can also be relatively large (e.g., in a range from 120° to 150° or more). In the example implementation shown in FIG. 1A, the output surfaces 146 and 148 of the optical extractor 140 are curved with a constant radius of curvature that is the same for both. Accordingly, luminaire module 100 has a plane of symmetry intersecting vertex 141 parallel to the y-z plane.

The surface of optical extractor 140 adjacent to the lower edge 132 of light guide 130 is optically coupled to edge 132. For example, optical extractor 140 can be affixed to light guide 130 using an index matching fluid, grease, or adhesive. In some embodiments, optical extractor 140 is fused to light guide 130 or they are integrally formed from a single piece of material.

During operation, light exiting light guide 130 through end 132 impinges on the reflective interfaces at portions of the redirecting surface 142 and 144 and is reflected outwardly towards output surfaces 146 and 148, respectively, away from the symmetry plane of the luminaire. The first portion of the redirecting surface 142 provides light having an angular distribution 138 towards the output surface 146, the second portion of the redirecting surface 144 provides light having an angular distribution 138' towards the output surface 146. The light exits optical extractor 140 through output surfaces 146 and 148. In general, the output surfaces 146 and 148 have optical power, to redirect the light exiting the optical extractor 140 in angular ranges 139 and 139', respectively. For example, optical extractor 140 may be configured to emit light upwards (i.e., towards the plane intersecting the LEEs and parallel to the x-y plane), downwards (i.e., away from that plane) or both upwards and downwards. In general, the direction of light exiting the luminaire through surfaces 146 and 148 depends on the divergence of the light exiting light guide 130 and the orientation of surfaces 142 and 144.

Surfaces 142 and 144 may be oriented so that little or no light from light guide 130 is output by optical extractor 140 in directions that are within a certain angle of the forward direction (i.e., in certain angular ranges relative to the positive z-direction). In embodiments where the luminaire module 100 is attached to a ceiling so that the forward direction is towards the floor, such configurations can help avoid glare and an appearance of non-uniform illuminance.

In general, the intensity profile of luminaire module 100 will depend on the configuration of the optical coupler 120, the light guide 130 and the optical extractor 140. For instance, the interplay between the shape of the optical coupler 120, the shape of the redirecting surface 143 of the optical extractor 140 and the shapes of the output surfaces 146, 148 of the optical extractor 140 can be used to control the angular width and prevalent direction (orientation) of the illumination.

In some implementations, the orientation of the illumination can be adjusted based on the included angle of the v-shaped groove 141 formed by the portions of the redirecting surface 142 and 144. In this manner, light can be extracted from the luminaire module 100 in a more forward direction for the smaller of two included angles formed by the portions of the redirecting surface 142, 144.

Furthermore, while surfaces 142 and 144 are depicted as planar surfaces, other shapes are also possible. For example, these surfaces can be curved or faceted. Curved redirecting surfaces 142 and 144 can be used to narrow or widen the beam. Depending of the divergence of the angular range of the light that is received at the input end 132' of the optical extractor 140, concave reflective surfaces 142, 144 can narrow the illumination output by the optical extractor 140, while convex reflective surfaces 142, 144 can widen the illumination output by the optical extractor 140. As such, suitably configured redirecting surfaces 142, 144 may introduce convergence or divergence into the light. Such surfaces can have a constant radius of curvature, can be parabolic, hyperbolic, or have some other curvature.

FIG. 1B shows an embodiment 100' of the disclosed luminaire module that is elongated along an axis (e.g., y-axis) perpendicular to the forward direction (e.g., along the z-axis.) In this case, a length L of the light guide 130 along the elongated dimension of the luminaire module 100' can be 2', 4' or 8', for instance. A thickness T of the light guide 130 orthogonal to the elongated dimension L (e.g., along the x-axis) is chosen to be a fraction of the distance D traveled by the guided light from the receiving end to the opposing end of the light guide 130. For T=0.05D, 0.1D or 0.2D, for instance, light from multiple, point-like LEEs 112—distributed along the elongated dimension L—that is edge-coupled into the light guide 130 at the receiving end can efficiently mix by the time it propagates to the opposing end.

FIG. 1C shows an embodiment 100" of the disclosed luminaire module that has a (e.g., continuous or discrete) rotational symmetry about the forward direction (e.g., z-axis.) Here, a diameter T of the light guide 130 is a fraction of the distance D traveled by the guided light from the receiving end to the opposing end of the light guide 130. For example, the diameter of the light guide 130 can be T=0.05D, 0.1D or 0.2D, for instance.

Other shapes of the disclosed luminaire module are possible. FIGS. 1D and 1E show a perspective view and a bottom view, respectively, of an embodiment 100''' of the disclosed luminaire module for which the light guide 130 has two opposing side surfaces 130a, 130b that form a closed cylinder shell of thickness T. In the example illustrated in FIGS. 1D and 1E, the x-y cross-section of the cylinder shell formed by the opposing side surfaces 130a, 130b is oval. In other cases, the x-y cross-section of the cylinder shell can be circular or can have other shapes. Some implementations of the example luminaire module 100''' may include a specular reflective coating on the side surface 130a of the light guide 130. Open curved shapes are possible.

While the foregoing discussion involves luminaire modules that direct light to both sides of the light guide, either in a symmetric or asymmetric manner, other configurations are also possible. In some embodiments, luminaire modules can be configured to direct light to only one side of the light guide.

Figure 1F:
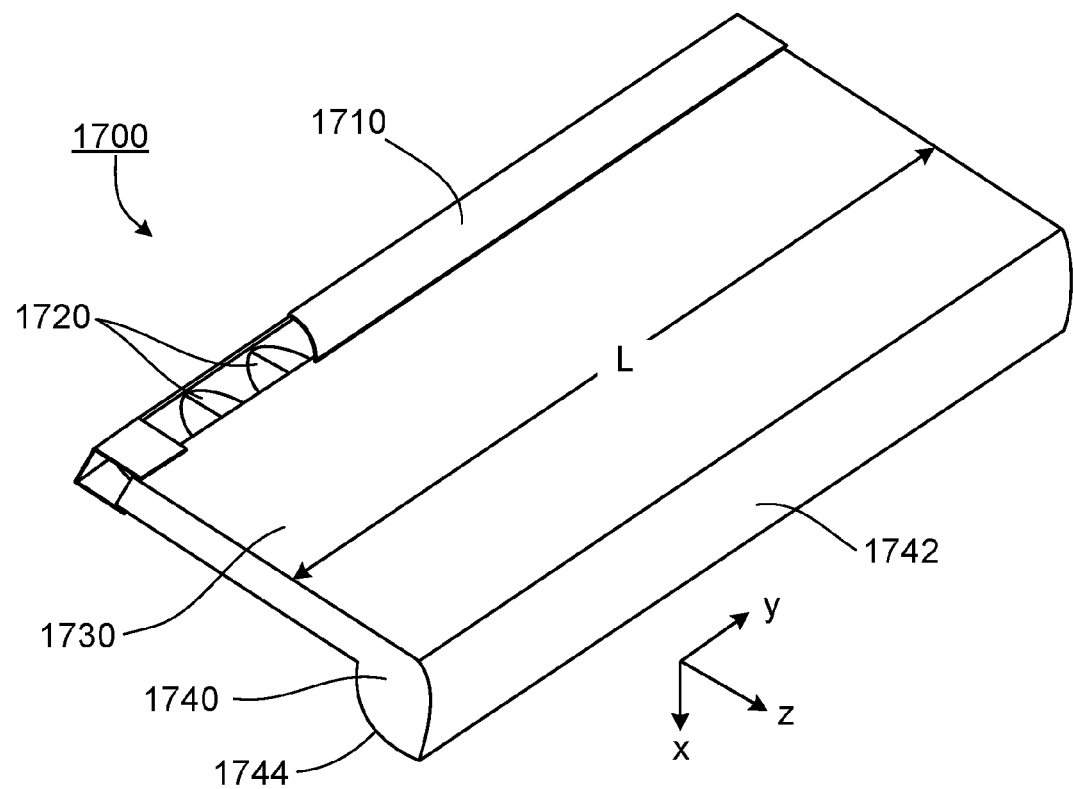
FIGS. 1F-1H are perspective views of an example of an elongated luminaire module with an unidirectional optical extractor.
Figure 1G:
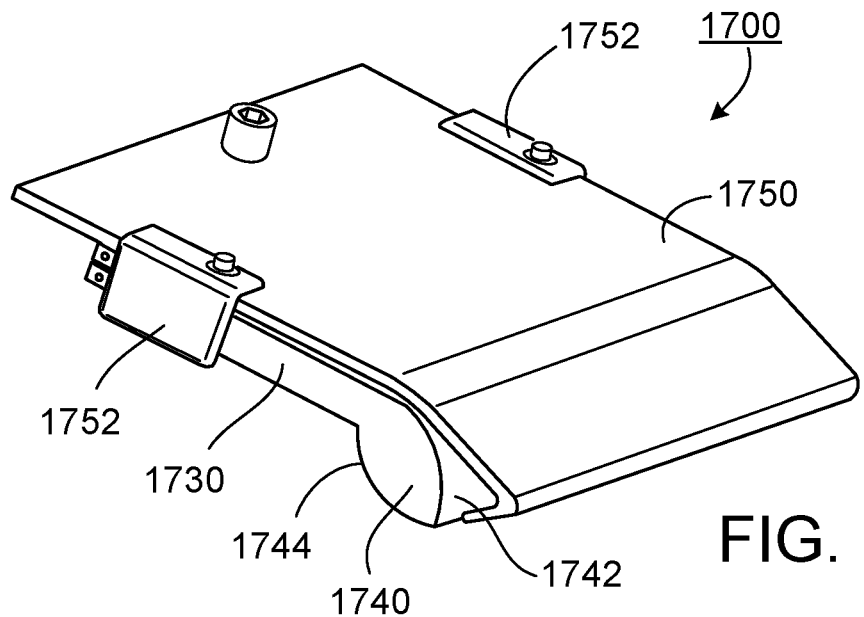
Figure 1H:
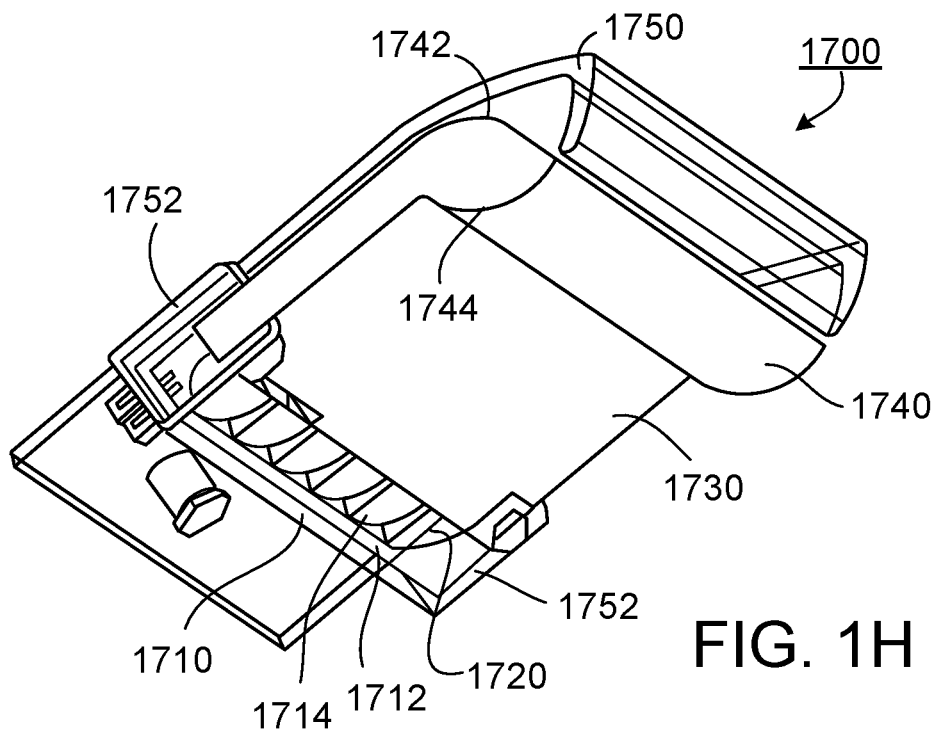
Figure 1I:
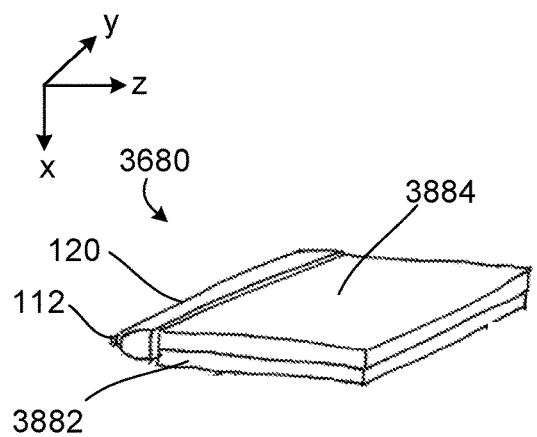
FIGS. 1I-1M show examples of luminaire modules with a light guide including multiple light guide elements.
Figure 1J:
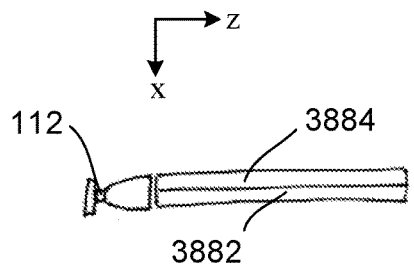
Figure 1K:
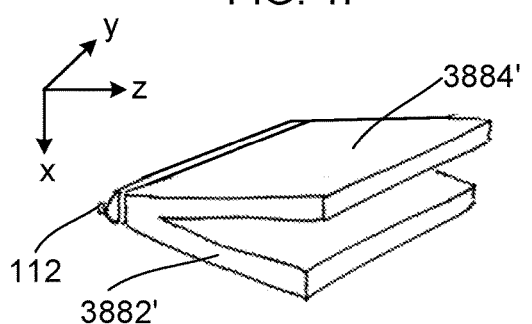
Figure 1L:
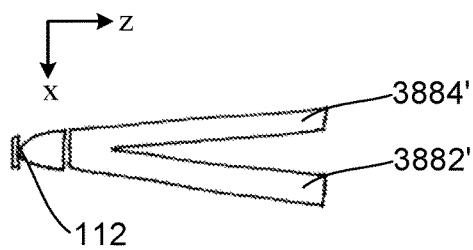
Figure 1M:
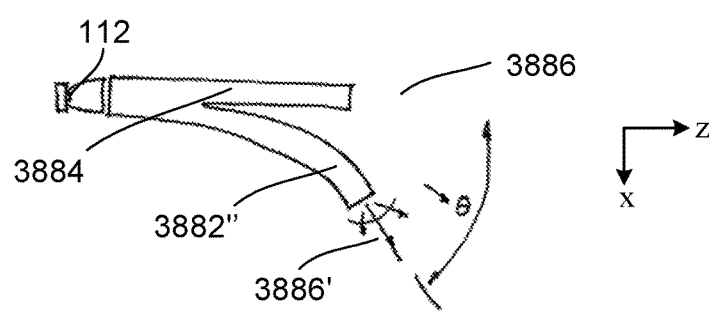

(ii) Luminaire Module with a Single Set of LEEs, a Single Light Guide and a Single Unidirectional Extractor Referring to FIGS. 1F-1H, a luminaire module 1700 is designed to output light in the positive x-direction, but not in the negative x-direction. Luminaire module 1700 includes a carrier 1710 that houses N LEEs 1714 mounted on a strip 1712, and a corresponding optical coupler 1720 mounted adjacent each LEE. Here N=4, 6, 10 or 20, for instance. Optical couplers 1720 are shaped to collimate light from LEEs 1714 in two orthogonal planes. Luminaire module 1700 also includes a light guide 1730 and an optical extractor 1740. Optical extractor 1740 includes a reflective optical interface 1742 and a light exit surface 1744. In cross-section, both reflective optical interface 1742 and light exit surface 1744 are convex (as viewed in the direction of propagation of light) in shape. However, light exit surface 1744 has a constant radius of curvature while the radius of curvature of optical interface 1742 varies. During operation, optical couplers 1720 collimate light from LEEs 1714 and direct the light to light guide 1730. The light propagates down light guide 1730 to optical extractor 1740, and reflects from optical interface 1742 out of the luminaire through light exit surface 1744. FIGS. 1G and 1H also show a mounting fixture 1750 and attachment brackets 1752 which attach luminaire module 1700 to mounting fixture 1750.

While the forgoing discussion describes luminaire modules with a light guide including a single light guide element, a light guide can also include two or more light guide elements.

(iii) Luminaire Module with a Single Set of LEEs and a Light Guide with Multiple Light Guide Elements FIGS. 1I-1M show portions of a luminaire module with a light guide 3680 that includes two light guide elements, 3882 and 3884 elongated along the y-axis and arranged adjacent to each other. In each of these examples, light is emitted by a single set 112 of LEEs. One or more optical couplers 120 can direct the light emitted by the LEEs of the single set 112 into the light guide 3680. In some embodiments, the light guide elements 3882 and 3884 can be separated by a layer (e.g., a reflective coating) from each other. The light guide elements can be arranged in a parallel configuration, such as 3882 and 3884. In some embodiments, the output ends of the light guide elements can be spaced apart, such as 3882' and 3884', or 3884 and 3882", to guide the light received from the one or more primary optics in different directions. The light guide elements can output light through an exit surface at the distal end of the light guide element, in angular ranges, such as angular ranges 3886 and 3886'.

Note that the luminaire modules described above in Sections (i)-(iii) each include a single set of LEEs, such that light emitted by the single set of LEEs is guided using one or more light guide elements to corresponding one or more extractors to be output onto a target environment. Other luminaire modules can include multiple sets of LEEs, such that light emitted by each of the sets of LEEs is guided using a respective light guide from among multiple light guides to one or more extractors to be output, onto the target environment, independently or interdependently from light emitted by another of the sets of LEEs.

Figure 2:
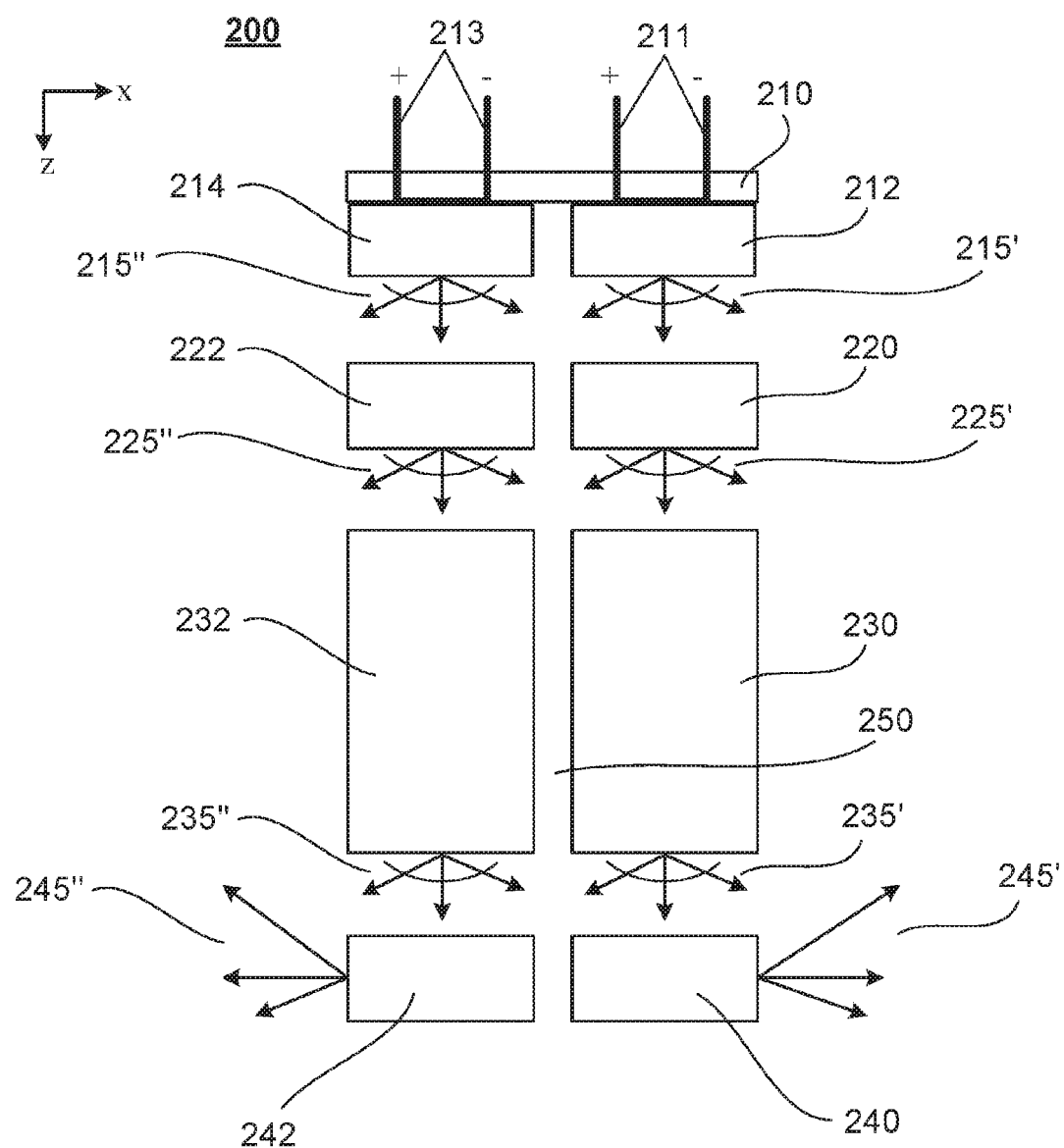
FIG. 2 is a schematic diagram of an example luminaire module with multiple independently controllable sets of LEEs and corresponding light guides and optical extractors.

(iv) Luminaire Module with Multiple Independently Controllable Sets of LEEs and Corresponding Light Guides and Unidirectional Extractors FIG. 2 is a schematic diagram of an example luminaire module 200 including two sets 212, 214 of LEEs, corresponding light guides 230, 232, and corresponding optical extractors 240, 242. If the two sets 212, 214 of LEEs are independently controlled (e.g., powered ON/OFF, dimmed, etc.), the luminaire module 200 can provide two separately controllable components of the photometric profile of the luminaire module 200. The optical extractors 240 and 242 may be designed to produce at least a portion of their flux output in at least two different dominant directions (e.g., along the +/−x axes.) Each of the sets 212 and 214 of LEEs can further include multiple subsets of independently controllable LEEs (not illustrated).

The luminaire module 200 includes sets 212 and 214 of LEEs that are disposed on substrate 210. While the substrate 210 is shown as a common substrate, other configurations (e.g., pairs of substantially parallel substrates corresponding to the pair of sets 212 and 214 of LEEs) can achieve the same functionality without departing from the intent of this technology. For example, a shared substrate can make it easier to maintain mechanical registration between the LEEs of the set 212 and the LEEs of the set 214, and allow for sharing a common power source, while a separate substrate may be suitable to reduce circuit board area or to allow for light guides of different length (e.g., to increase the mixing length of one light guide for better light homogeneity.)

The LEEs of set 212 and the LEEs of set 214 can be arranged in two or more elongated rows, for example along the y-axis (perpendicular to the page.) In some implementations, the rows may be populated by two or more different types of LEEs that are independently controllable via power connections 211, 213 such that different types of LEEs in any particular row can be controlled to create an elongated mix of light. The set 212 of LEEs emits light into a first emitted angular range 215' and the set 214 of LEEs emits light into a second emitted angular range 215".

The LEEs of set 212 and the LEEs of set 214 can be coupled with corresponding optical couplers 220 and 222. The LEEs can be integrated into their corresponding couplers, or separate components designed to create second beam distributions from the LEEs. The optical couplers 220 redirect light emitted by the set 212 of LEEs into the first emitted angular range 215' and provide redirected light in a first redirected angular range 225'. The optical couplers 222 redirect light emitted by the set 214 of LEEs into the second emitted angular range 215" and provide redirected light in a second redirected angular range 225".

The optical couplers 220 and 222 can be optically connected to corresponding light guides 230 and 232 which translate the light to corresponding optical extractors 240 and 242. Light provided by the light guide 230 to the optical extractor 240 has a first guided angular range 235', while light provided by the light guide 232 to the optical extractor 242 has a second guided angular range 235".

In some implementations, the light guides 230 and 232 are configured such that the first guided angular range 235' is substantially the same as the first redirected angular range 225' along the x-axis, and the second guided angular range 235" is substantially the same as the first redirected angular range 225" along the x-axis. Moreover, the light guide 230 has a first length (along the z-axis), a first width (along the y-axis) and a first thickness (along the z-axis) configured to homogenize the light emitted by the discrete LEEs of the set 212—which are distributed along the y-axis—as it is guided from the optical couplers 220 to the extractor 240. Similarly, the light guide 232 has a second length (along the z-axis), a second width (along the y-axis) and a second thickness (along the z-axis) configured to homogenize the light emitted by the discrete LEEs of the set 214—which also are distributed along the y-axis—as it is guided from the optical couplers 222 to the extractor 242. In this manner, the homogenizing of the first emitted light—as it is guided through the light guide 230—causes a change of a discrete profile along the y-axis of the first redirected angular range 225' to a continuous profile along the y-axis of the first guided angular range 235'. Also, the homogenizing of the second emitted light—as it is guided through the light guide 232—causes a change of a discrete profile along the y-axis of the second redirected angular range 225" to a substantially continuous profile along the y-axis of the second guided angular range 235".

The optical extractors 240 and 242 output the light received from respective light guides 230 and 232 into two or more illumination distributions. As such, the light output by the extractor 240 has a first output angular range 245' that is substantially continuous along the y-axis and has a propagation direction with a component parallel to the x-axis, and the light output by the extractor 242 has a second output angular range 245" that also is substantially continuous along the y-axis and has a propagation direction with a component antiparallel to the x-axis.

A space 250 between the light guides 230 and 232 can be configured to separate total internal reflection occurring within light guides 230 and 232 and lessen a degree of mixing and of the first light emitted from LEEs of set 212 that is guided by the light guide 230 with the second light emitted from LEEs of set 214 that is guided by the light guide 232. In some implementations, mixing between the first light emitted by the LEEs of set 212 that is guided by the light guide 230 with adjacent second light emitted by the LEEs 214 that is guided by the light guide 232 can be induced, such that the mixing of the first emitted light with the second emitted light occurs along the length of the light guide 230 and the light guide 232.

The space 250 between light guides 230 and 232 can include, for example, a medium such as air at a nominal index of refraction of 1.0. If the refractive index of the light guides 230, 232 is higher than the refractive index of such a medium, cross talk between first and second light from the LEEs of the set 212 and the LEEs of the set 214 can be eliminated. Such cross talk can be configured using a medium with a suitable refractive index. If the cross talk is substantially eliminated, independently controllable illumination distributions can be output by optical extractors 240 and 242, respectively. The independent control can be achieved via an electronic circuit that is coupled to the LEEs of the set 212 and the LEEs of the set 214. Thereby, the illumination profile and the electronic spectral mixing of light output by optical extractors 240 and 242 can be controlled independently. The independent control of light output can be used for spatially tunable luminaire modules providing a user with independent control of light distribution (e.g., for photobiological or aesthetic reasons, or user preferences.) For example, a color temperature of light output by optical extractor 240 can be different from a color temperature of light output by optical extractor 242, and/or a user or a control system can adjust the light output by the luminaire module to a desired balance.

In some implementations, at least a portion of the space 250 between light guides 230 and 232 can be filled with a material that matches the refractive index of the light guides 230 and 232 such that light mixing between light guides 230 and 232 can occur along these portions of the light guides 230 and 232. In some implementations, the light guides 230 and 232 can be molded such that they are joined for a portion of their length or height to create regions where light is mixed. In some implementations, other optional optical surfaces can be added to further manipulate the light within the space.

Example 1

Figure 3A:
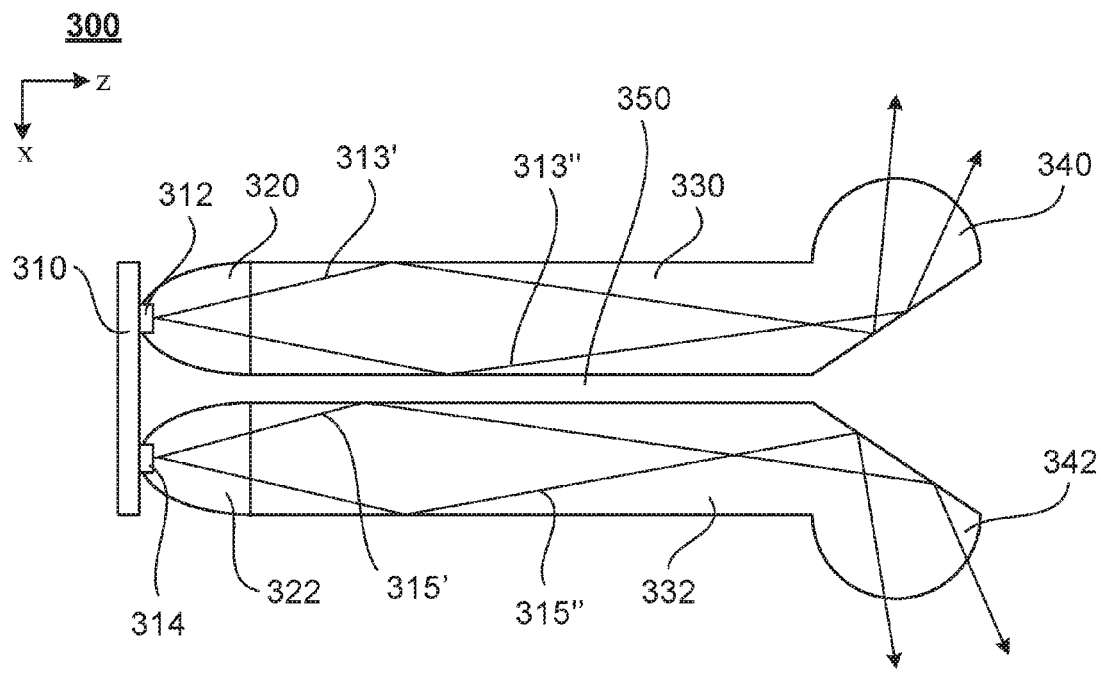
FIG. 3A is a cross sectional view of an example of a luminaire module with multiple independently controllable sets of LEEs and corresponding light guides and optical extractors.

FIG. 3A is a cross sectional view of an example luminaire module 300 with two independently controllable sets 312 and 314 of LEEs and corresponding light guides 330 and 332 and optical extractors 340 and 342. The luminaire module 300 includes couplers 320 and 322 to couple the respective sets 312 and 314 of LEEs to the corresponding light guides 330 and 332. Here, the LEEs of the set 312 and the LEEs of the set 314 are disposed on common substrate 310. The LEEs of the set 312 and the LEEs of the set 314 can be arranged in respective rows, for example elongated along the y-axis. In some implementations, the rows may be populated by two or more different types of LEEs that are independently controllable via power connections such that different types of LEEs in any particular row can be controlled to create an elongated mix of light.

The LEEs of the sets 312, 314 emit light that is redirected by the couplers 320, 322 towards light guides 330, 332. Light guides 330, 332 guide the light towards their corresponding optical extractors 340, 342. A space 350 between light guides 330 and 332 can be a filled with a medium (such as air) of a different index of refraction than the transparent material of light guides 330 and 332 such that input light flux from optical couplers 320 and 322 is translated via total internal reflection to the optical extractors 340 and 342 without mixing.

The optical extractors 340, 342 output the light through their respective light output surfaces as described above with respect to FIG. 1A. For example, FIG. 3A shows rays 313', 313" emitted from LEEs of the set 312 and rays 315', 315" emitted from LEEs of the set 314. Rays 313' and 313" are directed via coupler 320 and light guide 330 towards optical extractor 340, which outputs rays 313' and 313" through the light output surface of the optical extractor 340. Rays 315' and 315" are directed via coupler 322 and light guide 332 towards optical extractor 342, which outputs rays 315' and 315" through the light output surface of the optical extractor 342.

Figure 3B:
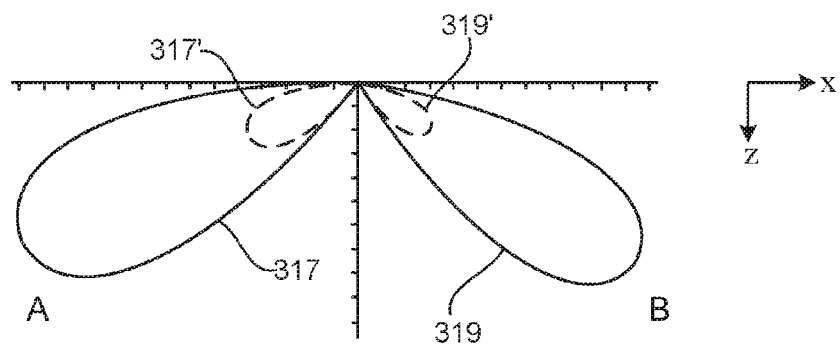
FIGS. 3B-3C show examples of illumination profiles of luminaire modules like the one shown in FIG. 3A.
Figure 3C:
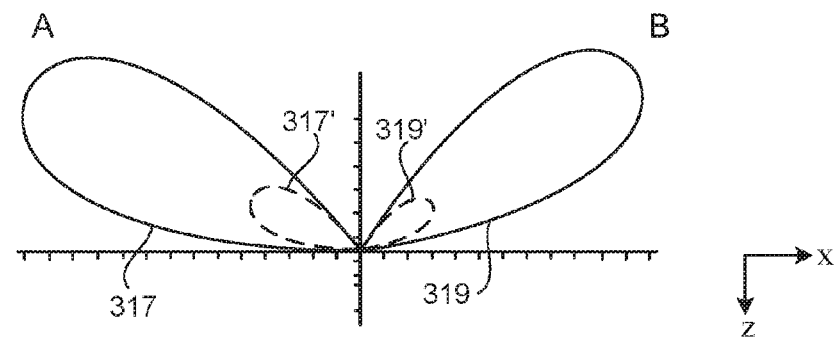

In some implementations, the optical extractors 340 and 342 can be asymmetric such that light that is output by each optical extractor has a different light distribution. Such optical extractors are referred to as unidirectional optical extractors. FIG. 3B shows an example of light intensity distribution 317 that is output by optical extractor 342 towards target area A and light intensity distribution 319 that is output by optical extractor 340 towards target area B. The light distributions 317 and 319 towards their corresponding target areas A and B can be adjustable, e.g., by electronically adjusting intensity, chromaticity, and/or flux of the set 312 of LEEs and the set 314 of LEEs, for example. Light intensity distributions 317' and 319' in FIG. 3B illustrate an example of adjusted light intensity distributions based on light intensity distributions 317 and 319, respectively, in which the set 314 of LEEs is dimmed more than the set 312 of LEEs. In other embodiments, the light distributions 317/317' and/or 319/319' may have negative z-components as shown in FIG. 3C.

Figure 4:
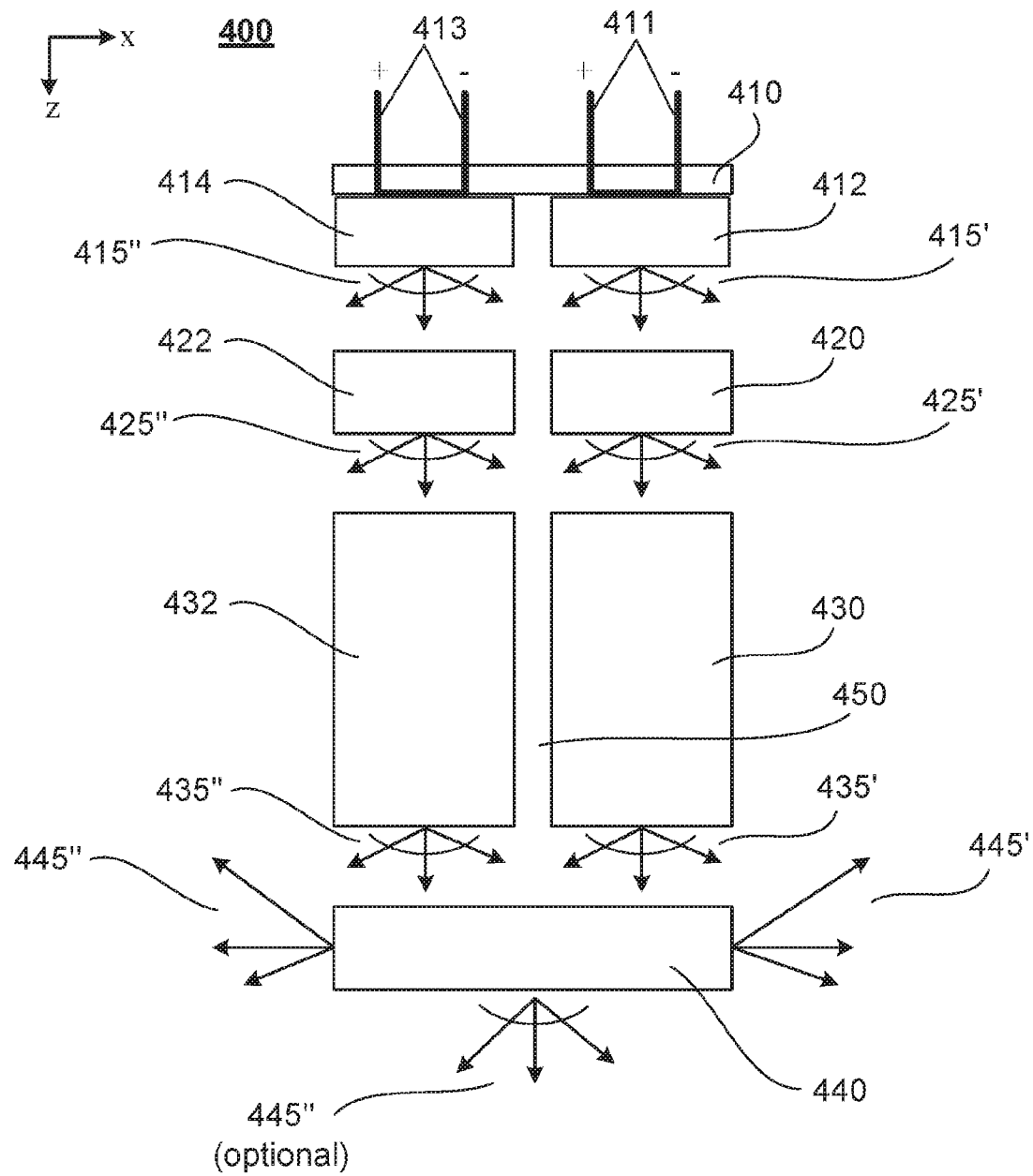
FIG. 4 is a cross sectional view of an example of a luminaire module with multiple independently controllable sets of LEEs and corresponding light guides and a single optical extractor.

(v) Luminaire Module with Multiple Independently Controllable Sets of LEEs and Corresponding Light Guides, and a Single Multidirectional Extractor FIG. 4 is a schematic diagram of an example luminaire module 400 including two sets 412 and 414 of LEEs, corresponding light guides 430, 432 and a single optical extractor 440.

One or more elongated substrates 410 are populated with the respective sets 412 and 414 of LEEs. The LEEs of the set 412 and the LEEs of the set 414 can be arranged in two or more elongated rows, for example along the y-axis. In some implementations, the rows may be populated by two or more different types of LEEs that are independently controllable (e.g., powered ON/OFF, dimmed, etc.) via power connections 411, 413 such that different types of LEEs in any particular row can be controlled to create an elongated mix of light. The sets 412 and 414 of LEEs can be coupled with corresponding optical couplers 420 and 422. The set 412 of LEEs emits light into a first emitted angular range 415' and the set 414 of LEEs emits light into a second emitted angular range 415".

The LEEs can be integrated into their corresponding couplers, or separate components designed to create second beam distributions from the LEEs. The optical couplers 420 redirect light emitted by the set 412 of LEEs into the first emitted angular range 415' and provide redirected light in a first redirected angular range 425'. The optical couplers 422 redirect light emitted by the set 414 of LEEs into the second emitted angular range 415" and provide redirected light in a second redirected angular range 425".

The optical couplers 420 and 422 can be optically connected to corresponding light guides 430 and 432 which translate the light to a combined optical extractor 440. Light provided by the light guide 430 to the single optical extractor 440 has a first guided angular range 435', while light provided by the light guide 432 to the single optical extractor 440 has a second guided angular range 435".

In some implementations, the light guides 430 and 432 are configured such that the first guided angular range 435' is substantially the same as the first redirected angular range 425' along the x-axis, and the second guided angular range 435'' is substantially the same as the first redirected angular range 425'' along the x-axis. Moreover, the light guide 430 has a first length (along the z-axis), a first width (along the y-axis) and a first thickness (along the z-axis) configured to homogenize the light emitted by the discrete LEEs of the set 412—which are distributed along the y-axis—as it is guided from the optical couplers 420 to the single extractor 440. Similarly, the light guide 432 has a second length (along the z-axis), a second width (along the y-axis) and a second thickness (along the z-axis) configured to homogenize the light emitted by the discrete LEEs of the set 414—which also are distributed along the y-axis—as it is guided from the optical couplers 422 to the single extractor 440. In this manner, the homogenizing of the first emitted light—as it is guided through the light guide 430—causes a change of a discrete profile along the y-axis of the first redirected angular range 425' to a continuous profile along the y-axis of the first guided angular range 435'. Also, the homogenizing of the second emitted light—as it is guided through the light guide 432—causes a change of a discrete profile along the y-axis of the second redirected angular range 425'' to a substantially continuous profile along the y-axis of the second guided angular range 435''.

The single optical extractor 440 outputs the light received from the light guides 430 and 432 into two or more light distributions. As such, the light output by the extractor 440 has a first output angular range 445' that is substantially continuous along the y-axis and has a propagation direction with a component parallel to the x-axis, and a second output angular range 445'' that also is substantially continuous along the y-axis and has a propagation direction with a component antiparallel to the x-axis. Optionally, the light output by the extractor 440 has a third output angular range 445''' that has a propagation direction parallel to the z-axis.

A space 450 between light guide 430 and 432 can be filled with a medium (such as air) of a different index of refraction than the transparent material of light guides 430 and 432 such that first light emitted by the set 412 of LEEs and second light emitted by the set 414 of LEEs are translated via total internal reflection from optical couplers 420 and 422 to the single optical extractor 440 without mixing.

In some implementations, a material matching the refractive index of light guides 430, 432 can be placed in the space 450 between at least a portion of the length or height of light guides 430 and 432, thereby creating a region where some mixing can occur before reaching optical extractor 440. This index matching could be a function of a manufacturing process that controls how much of an index matching material is inserted and where it is inserted to achieve the desired effect. In some implementations, optical couplers 420, 422, light guides 430, 432, and optical extractor 440 can be injection molded together and the area and location of material joining light guides 430 and 432 can be defined by a mold insert. Such process can provide a variable means to create customized mixing ratios for light that reaches optical extractor 440 from the independently controllable sets 412 and 414 of LEEs.

Example 2

Figure 5A:
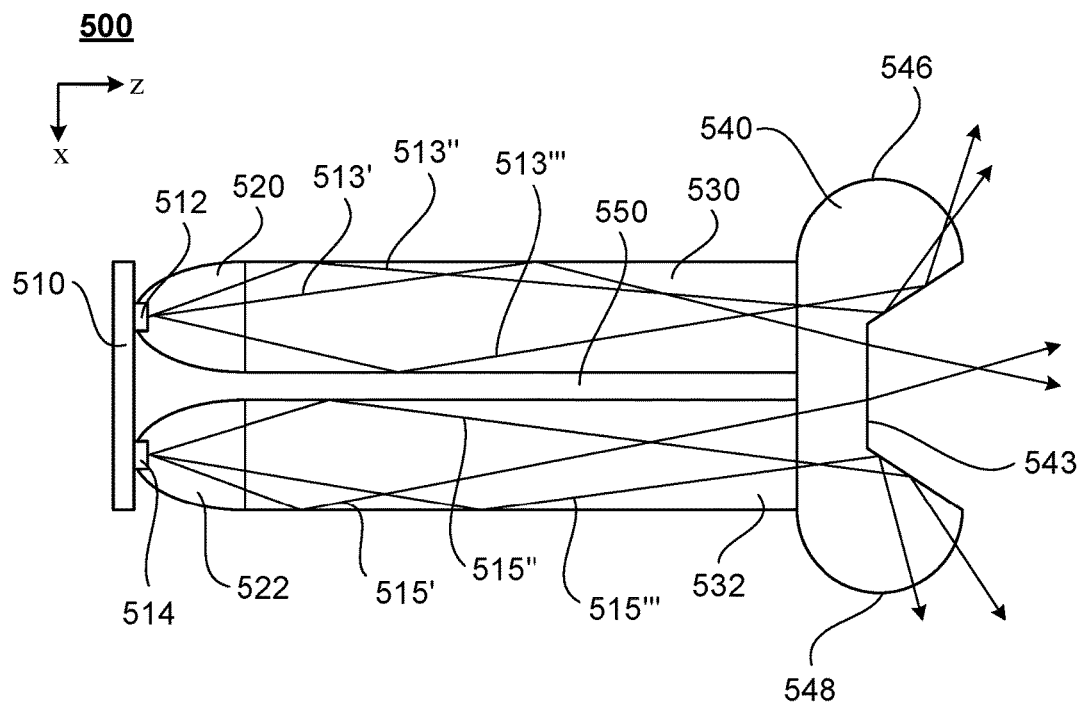
FIG. 5A is a cross sectional view of an example of a luminaire module with multiple independently controllable sets of LEEs and corresponding light guides and a single optical extractor.

FIG. 5A is a cross sectional view of an example luminaire module 500 with two independently controlled sets 512 and 514 of LEEs and corresponding light guides 530 and 532 and a common optical extractor 540. The luminaire module 500 includes couplers 520 and 522 to couple the respective sets 512 and 514 of LEEs to the corresponding light guides 530 and 532. Here, the LEEs of the set 512 and the LEEs of the set 514 are disposed on common substrate 510. The LEEs of the set 512 and the LEEs of the set 514 can be arranged in two or more rows, for example, elongated along the y-axis. In some implementations, the rows may be populated by two or more different types of LEEs that are independently controllable via power connections such that different types of LEEs in any particular row can be controlled to create an elongated mix of light.

The couplers 520, 522 and light guides 530, 532 are independent entities up to an interface between the light guides 530, 532 and the common optical extractor 540. In this configuration, light mixing between the light guides can be minimized until the light reaches the extractor 540, where at least some of the light can be blended within the extractor. First light emitted from LEEs of the set 512 and second light emitted from LEEs of the set 514 are coupled into the respective light guides 530, 532 via couplers 520, 522, which redirect the light towards the light guides 530, 532. A separation 550 of light guides 530, 532 by a medium or material with a refractive index that is lower than an index of refraction of the light guides 530, 532 can substantially prevent mixing of light that is guided through light guides 530, 532 until the light reaches an interface between the light guides 530, 532 and the common optical extractor 540.

For example, FIG. 5A shows rays 513', 513'', and 513''' emitted from LEE of the set 512 and rays 515', 515'', and 515''' emitted from LEE of the set 514. Rays 513'' and 513''' are directed via coupler 520 and light guide 530 towards optical extractor 540, which outputs rays 513'' and 513''' through light exit surface 546 of optical extractor 540. Rays 515'' and 515''' are directed via coupler 522 and light guide 532 towards optical extractor 540, which outputs rays 515'' and 515''' through light exit surface 548 of optical extractor 540. As illustrated in FIG. 5A, rays 513'', 513''' are output by optical extractor 540 without being mixed with light from LEEs of the set 514, and rays 515'', 515''' are output by optical extractor 540 without being mixed with light from LEEs of the set 512.

Ray 513' is directed via coupler 520 and light guide 530 towards optical extractor 540, and ray 515' is directed via coupler 522 and light guide 532 towards optical extractor 540. Both, ray 513' and ray 515'' are output by the optical extractor 540 through forward light exit surface 543. As illustrated in FIG. 5A, rays 513' and 515' are output by optical extractor 540 as mixed light from LEEs of the set 512 and LEEs of the set 514.

In some implementations, a varying separation between light guides 530, 532 can allow for a varying degree of light mixing between the light guides 530, 532. In some implementations, portions of the couplers 520, 522 and/or light guides 530, 532 can be joined together (e.g., with a material closely matching the refractive index of the couplers and/or light guides) to allow for localized mixing of light between couplers 520, 522 and/or light guides 530, 532.

Figure 5B:
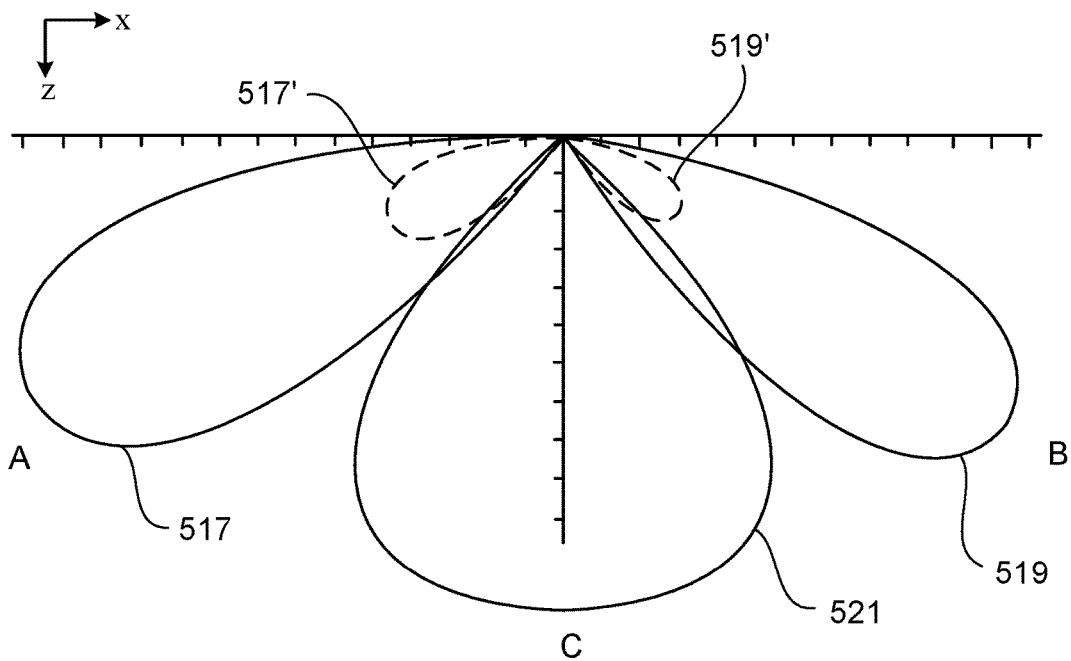
FIGS. 5B and 5D show examples of light distributions of a luminaire module like the one shown in FIG. 5A.

FIG. 5B shows an example of light intensity distributions 517, 519, and 521 that are output by optical extractor 540 towards target areas A, B and C respectively. Varying degrees of light mixing can be achieved for the target areas.

In this example, target area A is largely illuminated by light emitted from LEEs of the set 514 and directed towards light exit surface 548 of optical extractor 540 via coupler 522 and light guide 532. Target area B is largely illuminated by light emitted from LEEs of the set 512 and directed towards light exit surface 546 of optical extractor 540 via coupler 520 and light guide 530. Target area C is illuminated by a combination of light emitted by LEEs of the set 512 and LEEs of the set 514 that is directed towards forward light exit surface 543 of optical extractor 540. In other embodiments, the light distributions 517/517' and/or 519/519' may have negative z-components as shown in FIG. 5D.

The light intensity distributions 517, 519, and 521 illuminating their respective target areas A, B, and C, can be different or substantially the same. In some implementations, the light intensity distributions 517 and 519 can be independently controlled in intensity and color spectrum, for example, with a composite light distribution 521 radiating between light intensity distribution 517 and light intensity distribution 519. In some implementations, the light intensity distribution 521 can be used for central task illumination while the light intensity distributions 517 and 519 can be independently controlled with a constant aggregate of light flux.

In some implementations, a light distribution 521 can be defined and the light distributions 517 and 519 can be independently controlled, e.g., to obtain adjusted light distributions 517' and 519', respectively. In this manner, light intensity distributions 517 and 519 can be adjusted (e.g., dimmed) while the central distribution 521 remains relatively constant.

Figure 5C:
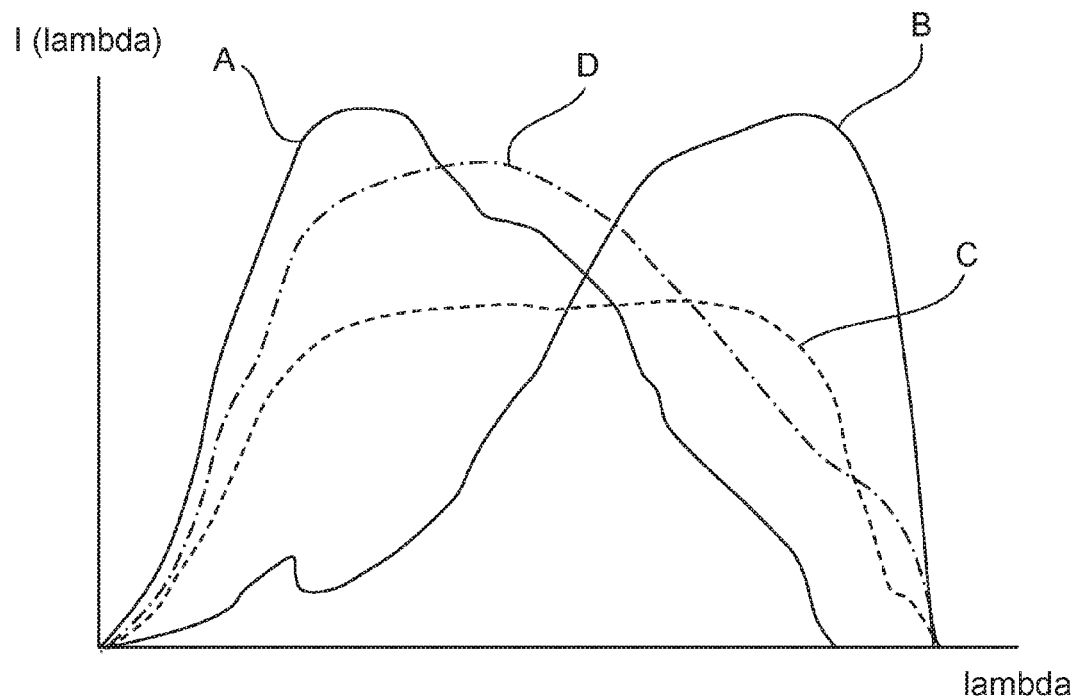
FIG. 5C shows examples of light spectra of the luminaire module like the one shown in FIG. 5A.
Figure 5D:
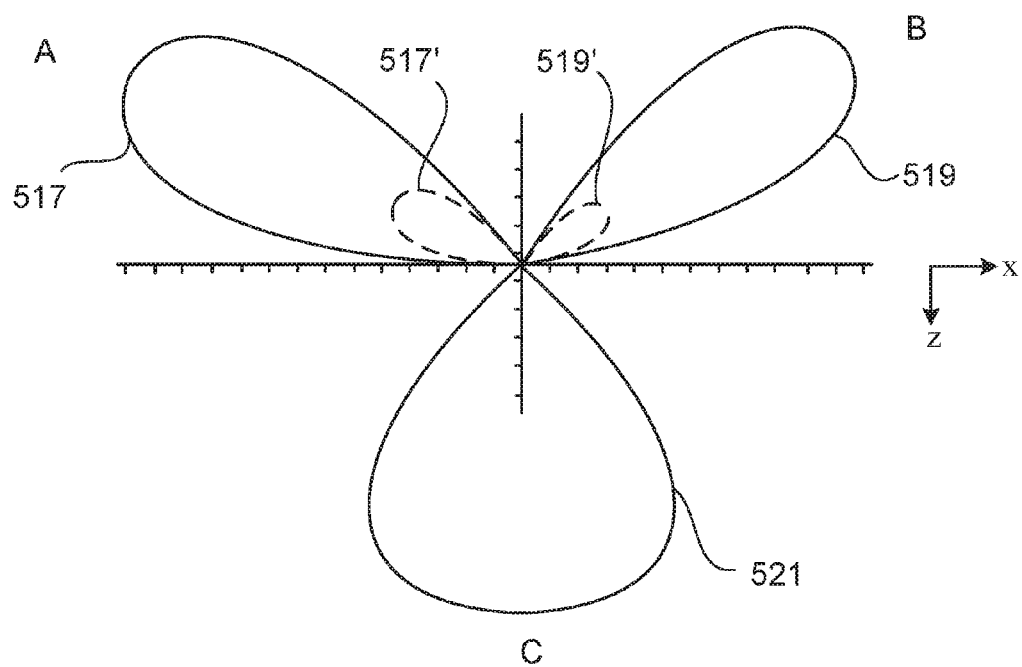

FIG. 5C shows examples of spectral distributions of a luminaire module, such as luminaire module 500. In this example, spectral distribution A (in this example representing white light shifted to the blue) is generated from light that exits light exit surface 548 of optical extractor 540; spectral distribution B (in this example representing white light shifted to the red) is generated from light that exits light exit surface 546; and spectral distribution C is generated from light that exits forward light exit surface 543 of optical extractor 540. In this manner, the spectral distribution C is a combination of white light shifted to the blue with white light shifted to the red. In some implementations, the spectral distribution C can be variable or constant. In some implementations, the spectral distributions A and B can be adjusted such that the spectral distribution C is substantially constant in terms of light flux over a large wavelength range. In some implementations, spectral distributions A and B can be manipulated such that several composite spectral distributions are generated. For example, FIG. 5C illustrates spectral distribution C, which is mostly constant over a large wavelength range and spectral distribution D, which is weighted stronger toward blue. Both spectral distributions C and D are generated by manipulating spectral distributions A and B.

(vi) Luminaire Module with Multiple Independently Controllable Sets of LEEs and Corresponding Light Guides Configured to Allow Controlled Mixing of Light Guided in Adjacent Light Guides As noted in sections (iv) and (v), luminaire modules can include a space between the couplers and/or light guides. This space can be filled with a medium configured to control the amount of light mixing between adjacent light guides during operation or manufacture of luminaire modules.

Example 3

Figure 6A:
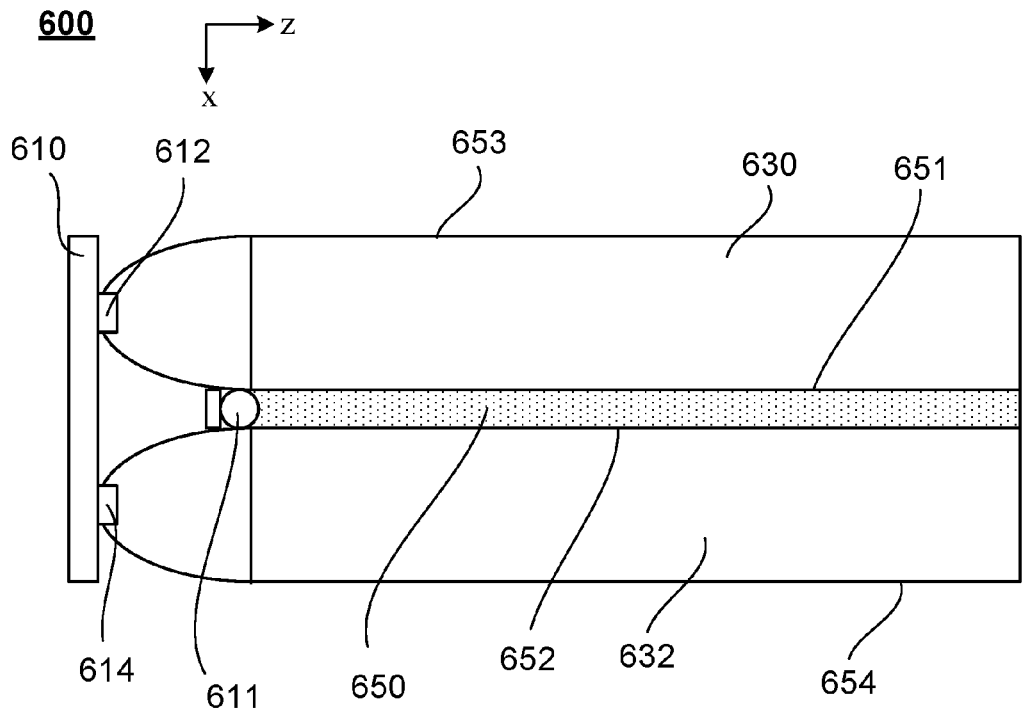
FIG. 6A is a cross sectional view of a portion of a luminaire module with multiple independently controllable sets of LEEs and corresponding light guides and an electronically controllable fluid between the light guides.

FIG. 6A is a cross sectional view of a portion of a luminaire module 600 with two independently controllable sets 612, 614 of LEEs and corresponding light guides 630, 632 and an electronically controllable fluid 650 between the light guides 630, 632. The sets 612, 614 of LEEs can be distributed in respective rows along the y-axis (perpendicular to the page) on a substrate 610. The electronically controllable fluid 650 can be enclosed by the light guides 630, 632, a dam 611 and an optical extractor (not shown in FIG. 6A) coupled with light guides 630, 632. In some implementations, the portion of the luminaire module 600 illustrated in FIG. 6A can be used as part of the luminaire 400 described above in connection with FIG. 4.

The electronically controllable fluid 650 can be manipulated, via electrowetting or other effects, for example. Electrowetting can be used to control where the light guides 630, 632 establish contact with the electronically controllable fluid 650 (e.g., by electronic movement of the electronically adjustable fluid between the dam 611 and the optical extractor.) A transparent electronically controllable fluid 650 can be used to bridge the space between the light guides at one or more (not illustrated) contact locations and as such frustrate total internal reflection at the contact locations to allow light to cross between the light guides 630 and 632. Depending on the embodiment, contact locations may be enabled and disabled by electronically concentrating the fluid 650 between and moving it along the light guides. Suitable electronic control can be used to determine areas where the fluid 650 can establish contact with the light guides. In some embodiments, the electronically controllable fluid 650 may have certain diffusive properties to help mix light within each of the light guides, or cause leakage of light out of the corresponding light guide, for example. Here, light that diffusely reflects off the boundary surface 651 or 652 between each of the light guides and the electronically controllable fluid 650 may emerge into the environment through lateral surfaces 653 or 654 of the light guides opposite to the boundary surface 651 or 652.

Depending on the embodiment, the electrowetting can be controlled via an electromagnetic field applied between one or more portions of the light guides 630 and 632 via suitably disposed pairs of electrodes (not illustrated), in order to control surface charges at the interfaces between the light guides 630 and/or 632, for example.

In some implementations, all or parts of the space between the light guides can be filled with a transparent or partly translucent material during manufacturing that can create a controlled optical coupling between adjacent light guides. Such material can be curable and the process can be employed to establish a certain degree of mixing between the light guides or to create a softly diffused illumination from the light guides, which can provide both effective and aesthetic luminance properties.

In some implementations, a liquid crystal material with switchable diffusion properties can be disposed between adjacent light guides. This material can be provided in a custom cut liquid crystal sheet with electrical contacts through which the liquid crystal sheet can be energized.

Example 4

Figure 6B:
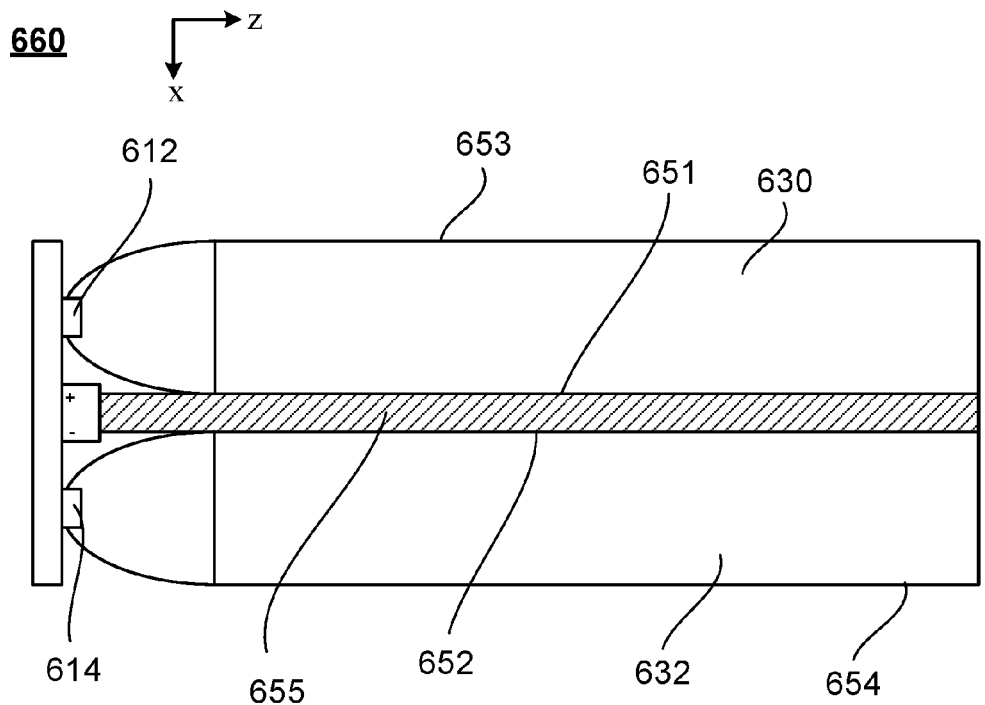
FIG. 6B is a cross sectional view of a portion of a luminaire module with multiple independently controllable sets of LEEs and corresponding light guides and a liquid crystal sheet between the light guides.

FIG. 6B is a cross sectional view of a portion of a luminaire module 660 with two independently controllable sets 612, 614 of LEEs adjacent light guides 630, 632 and a liquid crystal sheet 655 disposed between light guides 630, 632. The sets 612, 614 of LEEs can be distributed in respective rows along the y-axis (perpendicular to the page) on a substrate 610. The liquid crystal sheet 655 can be enclosed (as described below) between the light guides 630 and 632, over at least a portion of the boundary surfaces 651, 652 between the light guides 630, 632 and the liquid crystal sheet 655. In some implementations, the portion of the luminaire module 660 illustrated in FIG. 6B can be used as part of the luminaire 400 described above in connection with FIG. 4, the luminaire 500 described above in connection with FIGS. 5A and 5B or other luminaires.

When electrical current is applied to the liquid crystal sheet 655, the crystals align and the liquid crystal sheet 655 becomes substantially transparent. When electrical current is turned off, the crystals fall back to a random orientation and the liquid crystal sheet 655 becomes substantially translucent.

Liquid crystal sheets can provide a mode of light tuning for luminaire module 660. For example, various shapes and sizes of liquid crystal sheets can be laminated between adjacent light guides. When current is applied to one or more of the liquid crystal sheets, the crystals in the liquid crystal sheet are activated and the illumination properties of the luminaire module change. For example, the variable diffusion properties of the liquid crystal sheet can change the ratio of light guided along the z-axis towards the optical extractor(s) (not shown in FIG. 6B) such that more or less light is emitted from the optical extractor(s) versus from side surfaces 653 and 654 of the light guides.

The liquid crystal sheets can be applied in a variety of locations within a luminaire module 200 or 400, e.g., beyond the interstitial space between light guides. For example, liquid crystal sheets can be placed on any portion of either of the outer surfaces 653 and/or 654 of light guides, in full or partial sheets of various lengths, widths and patterns to create various types of diffuse emission designs on either of the outer surfaces 653 and/or 654 of the light guides.

In some implementations, a liquid crystal sheet can be applied on one or more light redirecting surfaces of an optical extractor (not shown in FIG. 6B.) In such configurations, the amount of light that is redirected can be electronically controlled to change the respective light distributions that are output by the optical extractor. For example, with respect to FIG. 5B, light distributions 517, 519, and 521 can be varied by adjusting the reflective properties of the redirecting surfaces of the optical extractor, which allows for additional photometric shaping of the luminaire module.

Depending on the embodiment, each of the independently controllable rows of LEEs implemented in the luminaire modules described herein can include the same or different types of LEEs. Different types of LEEs can be used to control chromaticity or color temperature of the light that is output from the luminaire module (e.g., when LEEs with two or more different correlated color temperatures or chromaticites are included per LEE row.)

What is claimed is:

1. A luminaire module comprising:
a first set of light-emitting elements (LEEs) disposed on one or more substrates and adapted to emit light in a forward direction;
a first light guide shaped to guide light, received from the first set of LEEs at an input end of the first light guide, in the forward direction to an output end of the first light guide and provide first guided light at the output end of the first light guide;
a second set of LEEs disposed on the one or more substrates and adapted to emit light in the forward direction, the second set of LEEs being independently controllable from the first set of LEEs;
a second light guide shaped to guide light, received from the second set of LEEs at an input end of the second light guide, in the forward direction to an output end of the second light guide and provide second guided light at the output end of the first light guide; and
an optical extractor optically coupled with the output end of the first light guide and the output end of the second light guide and adapted to receive the first and second guided light, the optical extractor comprising
a first redirecting surface adapted to reflect at least a portion of the light received at the optical extractor from the first light guide;
a first curved output surface arranged between the first redirecting surface and the first light guide and adapted to transmit, to an environment in a first direction, at least a portion of the light reflected by the first redirecting surface, the first direction having that has a component orthogonal to the forward direction and another component in a backward direction;
a second redirecting surface adapted to reflect at least a portion of the light received at the optical extractor from the second light guide;
a second curved output surface arranged between the second redirecting surface and the second light guide and adapted to transmit, to the environment in a second direction, at least a portion of the light reflected by the second redirecting surface, the second direction having a component antiparallel to the orthogonal component of the first direction and another component in the backward direction; and
a third output surface arranged between the first redirecting surface and the second redirecting surface and adapted to transmit, to the environment in the forward direction, a portion of the light received at the optical extractor from the first light guide and a portion of the light received at the optical extractor from the second light guide.

2. The luminaire module of claim 1, further comprising:
one or more first couplers positioned to receive a portion of the light emitted by the first set of LEEs and adapted to at least partially collimate the received portion of the light, the one or more first couplers being optically coupled with the first light guide at an input end of the first light guide; and
one or more second couplers positioned to receive a portion of the light emitted by the second set of LEEs and adapted to at least partially collimate the received portion of the light, the one or more second couplers being optically coupled with the second light guide at an input end of the second light guide.

3. The luminaire module of claim 1, wherein the second set of LEEs is adjacent to the first set of LEEs.

4. The luminaire module of claim 1, wherein the first and second light guides are spaced apart forming a space between the first and the second light guide, and wherein the space comprises a medium configured to control, during operation, total internal reflection at respective interfaces of the first and second light guides with the medium.

5. The luminaire module of claim 1, wherein one or more portions of the first light guide and the second light guide are connected to each other such that guided light is transmitted between the first and second light guides via the one or more connected portions.

6. The luminaire module of claim 1, wherein at least one of the first redirecting surface or the second redirecting surface of the optical extractor comprises a liquid crystal sheet.

7. The luminaire module of claim 1, wherein at least one of the first redirecting surface or the second redirecting surface of the optical extractor is at least partially reflective for light received from the first light guide or the second light guide, respectively.

8. The luminaire module of claim 7, wherein one or more of the first redirecting surface or the second redirecting surface of the optical extractor is partially transmissive for the light received from the first light guide or the second light guide, respectively.

9. The luminaire module of claim 1, wherein one or more of the first redirecting surface or the second redirecting surface of the optical extractor reflects substantially all of the portion of the light received from the first light guide or the second light guide, respectively.

10. The luminaire module of claim 1, wherein the first set of LEEs is powered independently from the second set of LEEs.

11. The luminaire of claim 10, wherein the first set of LEEs and the second set of LEEs are independently controllable via a first power connection to the first set of LEEs and second power connection to the second set of LEEs.

12. The luminaire module of claim 1, wherein the first set of LEEs are independently controllable from the second set of LEEs to selectively provide different relative intensities between light provided along the first direction and light provided along the second direction.

13. The luminaire module of claim 1, wherein the first set of LEEs are independently controllable from the second set of LEEs to selectively provide different chromaticities between light provided along the first direction and light provided along the second direction.

14. The luminaire of claim 1, wherein a subset of one of more LEEs of the first set of LEEs are operated independently of other LEEs of the first set of LEEs.

15. The luminaire of claim 14, wherein a subset of one of more LEEs of the second set of LEEs are operated independently of other LEEs of the second set of LEEs.

16. The luminaire of claim 1, wherein each of the first light guide and the second light guide comprises a pair of parallel side surfaces extending between the associated input end and the associated output end.

17. The luminaire of claim 1, wherein each of the first output surface and the second output surface is shaped like a sector of a cylindrical shell having a cylindrical axis orthogonal to the forward direction.

18. The luminaire of claim 17, wherein the cylindrical shell has a constant radius.

* * * * *

UNITED STATES PATENT AND TRADEMARK OFFICE
CERTIFICATE OF CORRECTION

PATENT NO. : 10,132,988 B2
APPLICATION NO. : 15/150300
DATED : November 20, 2018
INVENTOR(S) : Allan Brent York Page 1 of 1

It is certified that error appears in the above-identified patent and that said Letters Patent is hereby corrected as shown below:

In the Claims

Column 20, Line 11, in Claim 1, before "a component" delete "that has".

Signed and Sealed this
Nineteenth Day of February, 2019

Andrei Iancu
*Director of the United States Patent and Trademark Office*